(12) United States Patent
Yang et al.

(10) Patent No.: US 12,467,004 B2
(45) Date of Patent: *Nov. 11, 2025

(54) PROCESS AND SYSTEM FOR HYDROTREATING DEOILED ASPHALT

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Qinghe Yang, Beijing (CN); Shuling Sun, Beijing (CN); Dawei Hu, Beijing (CN); Chuanfeng Niu, Beijing (CN); Yanzi Jia, Beijing (CN); Lishun Dai, Beijing (CN); Zhen Wang, Beijing (CN); Anpeng Hu, Beijing (CN); Liang Ren, Beijing (CN); Dadong Li, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

(*) Notice: Subject to any disclaimer, the term of this patent is extended or adjusted under 35 U.S.C. 154(b) by 411 days.

This patent is subject to a terminal disclaimer.

(21) Appl. No.: 17/772,799

(22) PCT Filed: Oct. 30, 2020

(86) PCT No.: PCT/CN2020/125109
§ 371 (c)(1),
(2) Date: Apr. 28, 2022

(87) PCT Pub. No.: WO2021/083305
PCT Pub. Date: May 6, 2021

(65) Prior Publication Data
US 2022/0372385 A1  Nov. 24, 2022

(30) Foreign Application Priority Data

Oct. 31, 2019  (CN) .......................... 201911053414.X
Oct. 31, 2019  (CN) .......................... 201911053430.9
(Continued)

(51) Int. Cl.
*C10G 69/00* (2006.01)

(52) U.S. Cl.
CPC ....... *C10G 69/00* (2013.01); *C10G 2300/201* (2013.01); *C10G 2300/202* (2013.01);
(Continued)

(58) Field of Classification Search
None
See application file for complete search history.

(56) References Cited

U.S. PATENT DOCUMENTS 4,359,379 A     11/1982  Ushio et al.
4,359,479 A *   11/1982  Terasawa ................. A23G 4/06
                                                    426/3
(Continued)

FOREIGN PATENT DOCUMENTS

CN     1654603 A     8/2005
CN     1274419 C     9/2006
(Continued)

OTHER PUBLICATIONS

International Search Report (PCT/ISA/210) with an English translation and Written Opinion (PCT/ISA/237) mailed on Jan. 27, 2021, by the China National Intellectual property Administration as the International Searching Authority for International Application No. PCT/CN2020/125109. (12 pages).
(Continued)

*Primary Examiner* — Prem C Singh
*Assistant Examiner* — Brandi M Doyle
(74) *Attorney, Agent, or Firm* — Panitch Schwarze Belisario & Nadel LLP

(57) ABSTRACT

Described are a process and a system for hydrotreating a deoiled asphalt. The process includes: (2) introducing a
(Continued)

deoiled asphalt and an aromatics-containing stream into a first reaction unit for hydrogenation reaction, wherein the first reaction unit comprises a mineral-rich precursor material and/or a hydrogenation catalyst, and the first reaction unit is a fixed bed hydrogenation unit; (21) fractionating the liquid-phase product from the first reaction unit to provide a first light component and a first heavy component; (31) introducing the first light component into a second reaction unit for reaction, to provide a gasoline component, a diesel component and/or a BTX feedstock component; and (32) introducing the first heavy component to a delayed coking unit for reaction; or using the first heavy component as a low sulfur ship fuel oil component.

40 Claims, 3 Drawing Sheets

(30) Foreign Application Priority Data

| Oct. 31, 2019 | (CN) | 201911053706.3 |
|---|---|---|
| Oct. 31, 2019 | (CN) | 201911054142.5 |
| Oct. 31, 2019 | (CN) | 201911054170.1 |
| Oct. 31, 2019 | (CN) | 201911054710.7 |

(52) U.S. Cl.
CPC . *C10G 2300/205* (2013.01); *C10G 2300/301* (2013.01); *C10G 2300/302* (2013.01); *C10G 2300/305* (2013.01); *C10G 2300/308* (2013.01); *C10G 2300/4006* (2013.01); *C10G 2300/4012* (2013.01); *C10G 2300/4018* (2013.01); *C10G 2400/02* (2013.01); *C10G 2400/04* (2013.01); *C10G 2400/30* (2013.01)

(56) References Cited

U.S. PATENT DOCUMENTS

| 4,659,455 A * | 4/1987 | Dall | B01J 8/44 208/209 |
|---|---|---|---|
| 2013/0075303 A1 * | 3/2013 | Heraud | C10G 65/02 208/50 |
| 2013/0233768 A1 | 9/2013 | Bourane et al. | |
| 2016/0053189 A1 | 2/2016 | Wang et al. | |
| 2017/0009154 A1 | 1/2017 | Oprins et al. | |
| 2017/0015916 A1 | 1/2017 | Oprins et al. | |
| 2017/0022433 A1 * | 1/2017 | Brown | C10G 67/049 |
| 2020/0291305 A1 * | 9/2020 | Mukherjee | C10G 9/16 |

FOREIGN PATENT DOCUMENTS

| CN | 100340643 C | 10/2007 |
|---|---|---|
| CN | 101418222 A | 4/2009 |
| CN | 102311799 A | 1/2012 |
| CN | 102453541 A | 5/2012 |
| CN | 104232158 A | 12/2014 |
| CN | 103102944 B | 4/2015 |
| CN | 103102982 B | 9/2015 |
| CN | 103805240 B | 11/2015 |
| CN | 105623725 A | 6/2016 |
| CN | 108546565 A | 9/2018 |
| JP | 2017511828 A | 4/2017 |
| JP | 2019104920 A | 6/2019 |
| RU | 2570200 C2 | 12/2015 |

OTHER PUBLICATIONS

Written Opinion issued on Mar. 17, 2023, by the Intellectual Property Office of Singapore in Singaporean Application No. 11202204609P.

Office Action issued on Oct. 15, 2024, by the Japanese Patent Office in corresponding JP Application No. 2022525048, and English translation of the Office Action (11 pages).

Examination Report issued on Mar. 28, 2025, by the Indian Intellectual Property Office in corresponding IN Application No. 202247030210, and English translation of the Office Action (6 pages).

Office Action issued on May 12, 2025, by the Brunei Darussalam Intellectual Property Office in corresponding BN Application No. BN/N/2022/0063 (16 pages).

* cited by examiner

PROCESS AND SYSTEM FOR HYDROTREATING DEOILED ASPHALT

TECHNICAL FIELD

The invention relates to the field of processing hydrocarbon oil, in particular to a process for hydrotreating deoiled asphalt and a system for hydrotreating deoiled asphalt.

BACKGROUND

Highly effective conversion of residual oil is the core of oil refining enterprises. The residual oil hydrogenation on fixed bed is a key technology for the highly effective conversion of residual oil, and has the characteristics of good product quality, mature process and the like.

However, the high content of asphaltene and metals in the residual oil is a limiting factor of the operation period of the residual oil hydrogenation on fixed bed.

In order to solve the problem, a solvent deasphalting (demetalization), hydrotreating-catalytic cracking combined process technology (SHF) for residual oil developed by SINOPEC Research Institute of Petroleum Processing (RIPP) is an innovative technology for producing clean fuels for vehicles from low-value vacuum residual oil to the maximum extent and prolonging the running period. However, because of high softening point of the deoiled asphaltene (DOA), the transportation and the utilization are difficult, and the popularization of the SHF technology is limited.

The new combined process for producing products rich in propylene by hydrogenation-deep catalytic cracking (DCC) of residual oil is also limited by the influence of asphaltene and metals in the residual oil. The hydrogen content of the hydrogenated residual oil is low, the operation period of the residual oil hydrogenation is short, the yield of propylene from DCC is low, and the economic benefit of the combination technology is limited.

In addition, in 2020, a new low-sulfur ship fuel standard with a sulfur fraction ≯0.5 wt % and a low-sulfur petroleum coke standard with a sulfur fraction ≯3.0 wt % are to be implemented. A technology for producing the low-sulfur ship fuel (low-sulfur petroleum coke) at low cost is also a problem which needs to be solved urgently at present.

Therefore, the conversion of DOA to material for low sulfur ship fuel or for low sulfur petroleum coke production is a technical challenge that needs to be addressed.

SUMMARY OF THE INVENTION

The purpose of the invention is to overcome the defects of the prior art and to provide a process and a system for hydrotreating deoiled asphalt, which can realize high-value utilization of DOA.

In order to achieve the purpose above, a first aspect of the present invention provides a process for hydrotreating deoiled asphalt, comprising:

(2) introducing a deoiled asphalt and an aromatics-containing stream into a first reaction unit to for hydrogenation reaction, wherein the first reaction unit comprises a mineral-rich precursor material and/or a hydrogenation catalyst, the hydrogenation catalyst can catalyze at least one reaction selected from hydrodemetallization reaction, hydrodesulfurization reaction, hydrodeasphalting reaction and hydrodecarbonization reaction, the first reaction unit is a fixed bed hydrogenation unit, the deoiled asphalt and the aromatics-containing stream are used in such an amount ratio that a mixed feedstock formed by the deoiled asphalt and the aromatics-containing stream is in liquid state at a temperature of not higher than 400° C., and the mineral-rich precursor material is a material capable of adsorbing at least one metal selected from V, Ni, Fe, Ca and Mg;

(21) fractionating a liquid-phase product from the first reaction unit to provide a first light component and a first heavy component, wherein the cutting point for the first light component and the first heavy component is at 240-450° C.;

(31) introducing the first light component into a second reaction unit for reaction, to provide at least one product selected from a gasoline component, a diesel component and a BTX feedstock component, wherein the second reaction unit is at least one selected from the group consisting of a hydrocracking unit, a catalytic cracking unit and a diesel hydro-upgrading unit; and

(32) introducing the first heavy component into a delayed coking unit for reaction, to provide at least one product selected from the group consisting of coker gasoline, coker diesel, coker wax oil and low sulfur petroleum coke; or using the first heavy component as a component of low sulfur ship fuel oil.

The invention also relates to variants of the process of the first aspect.

A second aspect of the present invention provides a system for hydrotreating deoiled asphalt, comprising:

the first reaction unit, which is a fixed bed hydrogenation unit and is used for carrying out hydrogenation reaction of the deoiled asphalt and the aromatics-containing stream therein;

a separation unit in fluid communication with the first reaction unit, for fractionating the liquid phase product from the first reaction unit therein;

a second reaction unit in fluid communication with the separation unit, for reaction therein of the first light component obtained in the separation unit, wherein the second reaction unit being at least one selected from the group consisting of a hydrocracking unit, a catalytic cracking unit, and a diesel hydro-upgrading unit;

a delayed coking unit in fluid communication with the separation unit, for reaction therein of the first heavy component obtained from the separation unit, to provide at least one product selected from the group consisting of coker gasoline, coker diesel, coker wax oil, and low sulfur petroleum coke;

an outlet in fluid communication with the separation unit, for discharging the first heavy component obtained from the separation unit as a low sulfur ship fuel oil fraction from the system.

The invention also relates to variants of the system of the second aspect.

According to the invention, DOA and aromatics-containing stream are together subjected to hydrotreatment by a fixed bed (such as hydrodesulfurization), and the hydrogenated first light component is subjected to hydrocracking (RLG or RLA) to produce BTX and diesel fractions, or subjected to catalytic cracking (LTAG) to produce gasoline fractions (and liquefied gas); and low-sulfur petroleum coke or heavy low-sulfur ship fuel is produced by the hydrogenated first heavy component.

The treatment process provided by the invention can realize high-value DOA utilization.

Figure 1:
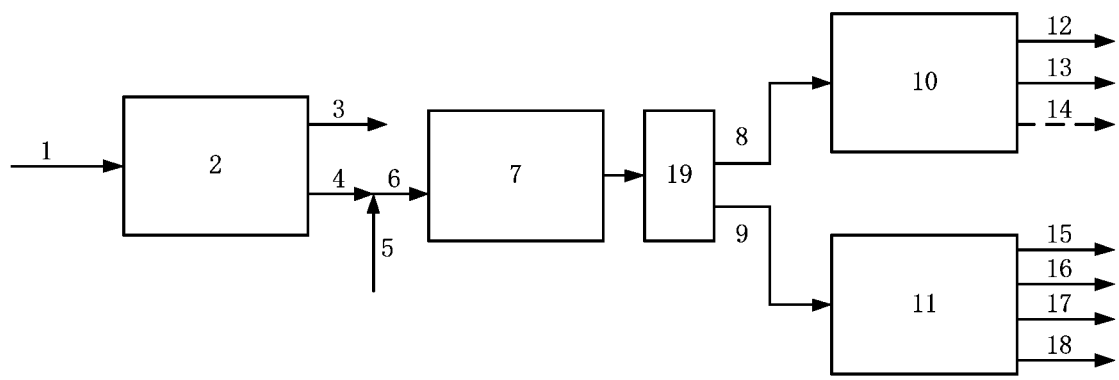
FIG. 1 is a flow chart of a process for hydrotreating deoiled asphalt according to an embodiment of the first variant of the first aspect of the present invention.

| Description of the reference signs | | | |
|---|---|---|---|
| 1 | Heavy oil feedstock | 2 | Solvent deasphalting unit |
| 3 | Deasphalted oil | 4 | Deoiled asphalt |
| 5 | Aromatics-containing stream | 6 | Mixed feedstocks |
| 7 | First reaction unit | 8 | First light component |
| 9 | First heavy component | 10 | Second reaction unit |
| 11 | Delayed coking unit | 12 | BTX feedstock component |
| 13 | Gasoline component | 14 | Diesel component |
| 15 | Coker gasoline | 16 | Coker diesel |
| 17 | Coker wax oil | 18 | Low sulfur petroleum coke |
| 19 | Separation unit | 20 | Liquid phase effluent |
| 21 | DCC unit | 22 | Propylene |
| 23 | LCO | 24 | HCO |
| 25 | Slurry oil | 26 | Fourth hydrogenation unit |
| 27 | Demetallized slurry oil | 29 | Third hydrogenation unit |
| | | 30 | Aromatics-rich fraction oil |
| 31 | Fifth reaction unit | 32 | Second heavy component |
| 33 | Slurry oil | 34 | Sixth hydrogenation unit |
| 35 | DCC unit | 36 | Propylene |
| 37 | LCO | 38 | HCO |

EMBODIMENTS

The endpoints and any values of the ranges disclosed herein are not limited to the precise range or value, while these ranges or values should be understood to encompass values close to these ranges or values. For numerical ranges, each range between its endpoints and individual point values, and each individual point value can be combined with each other to give one or more new numerical ranges, and such new numerical ranges should be construed as specifically disclosed herein.

In the present invention, the coding numbers of (1), (2), (3), (31) and the like indicating the steps, the coding numbers of first, second and the like indicating the various embodiments/variants, and the numbers of the respective reference signs of drawings are provided mainly to be distinguished from each other, and are not to be construed as the order of steps or the order of combination of parts in the process, unless specifically stated. Further, when referring to (hydrogenation) reaction units, some exemplary embodiments of the reaction units of the present invention are implemented by hydrogenation reactions, and thus, for convenience, when the present invention is directed to terms first, second, and the like reaction units, these terms may be used interchangeably with the terms first, second, and the like hydrogenation units according to the particular embodiment, and one skilled in the art will understand that they refer to the same object in this particular embodiment.

As stated above, a first aspect of the present invention provides a process for hydrotreating deoiled asphalt, the process of the first aspect generally comprising:

(2) introducing deoiled asphalt and an aromatics-containing stream into a first reaction unit for hydrogenation reaction, wherein the deoiled asphalt and the aromatics-containing stream are used in such an amount ratio that a mixed feedstock formed by the deoiled asphalt and the aromatics-containing stream is in a liquid state at a temperature of not higher than 400° C.;

(21) fractionating a liquid-phase product from the first reaction unit to provide a first light component and a first heavy component, wherein the cutting point for the first light component and the first heavy component is at 240-450° C.;

(31) introducing the first light component into a second reaction unit for reaction, to provide at least one product selected from a gasoline component, a diesel component and a BTX feedstock component, wherein the second reaction unit is at least one selected from the group consisting of a hydrocracking unit, a catalytic cracking unit and a diesel hydro-upgrading unit; and

(32) introducing the first heavy component into a delayed coking unit for reaction, to provide at least one product selected from the group consisting of coker gasoline, coker diesel, coker wax oil and low sulfur petroleum coke; or using the first heavy component as a component of low sulfur ship fuel oil.

Further, the present invention provides a plurality of embodiments and variants of the first aspect. In the context of the present invention, where embodiments and variants of the first, second or other aspects of the invention are described for the same object, the description and/or definition for the various features employed may apply to each aspect of the invention and to each embodiment and variant thereof, unless a different or more specific description and/or definition is provided for that aspect or for a particular embodiment or variant thereof.

Preferably, the deoiled asphalt and the aromatics-containing stream are used in such an amount ratio that a mixed feedstock formed from the deoiled asphalt and the aromatics-containing stream is in a liquid state at a temperature of not higher than 280° C. It is further preferred that the deoiled asphalt and the aromatics-containing stream are used in such a ratio that the mixed feedstock formed from the deoiled asphalt and the aromatics-containing stream is in a liquid state at a temperature of not higher than 100° C.

Particularly preferably, the first light component and the first heavy component have a cutting point of 350° C.

In one embodiment, in step (2), the hydrogenation reaction in the first reaction unit is carried out in the presence of a hydrogenation catalyst.

Preferably, in step (2), the deoiled asphalt and the aromatics-containing stream are used in a ratio such that the viscosity at 100° C. of the mixed feedstock formed from the deoiled asphalt and the aromatics-containing stream is not greater than 400 mm$^2$/s, more preferably not greater than 200 mm$^2$/s, further preferably not greater than 100 mm$^2$/s.

Preferably, in step (2), the aromatics-containing stream is a aromatics-rich fraction oils and/or aromatic hydrocarbon compounds.

Preferably, the aromatics-rich fraction oil has an end point of 200° C.-540° C., and an aromatics content of equal to or greater than 20 wt %, preferably equal to or greater than 40 wt %, more preferably equal to or greater than 50 wt %.

Preferably, the aromatics-rich fraction oil is at least one selected from LCO, HCO, ethylene tar, coal tar, coker diesel and coker wax oil. The aromatics-rich fraction oil according to the present invention may be obtained from another process outside the process according to the present invention, or may be obtained from the process according to the present invention.

Preferably, the aromatic hydrocarbon is one or more selected from benzene, toluene, xylene, naphthalene, methylnaphthalene, multi-branched naphthalene and aromatic hydrocarbon with more than two rings, and preferably polycyclic aromatic hydrocarbon with no more than three rings or a mixture thereof. Particularly preferably, the aromatic hydrocarbon is at least one selected from the group consisting of benzene, toluene, xylene, naphthalene, naphthalene substituted with at least one $C_{1-6}$ alkyl group, and tricyclic or higher aromatic hydrocarbons.

According to a preferred embodiment, in step (2), the aromatics-containing stream is an aromatics-rich fraction oil, and the weight ratio of the amount of the deoiled asphalt to the amount of the aromatics-containing stream is from 1:10 to 50:10, more preferably from 3:10 to 30:10.

According to another preferred embodiment, in step (2), the aromatics-containing stream is an aromatic hydrocarbon, and the weight ratio of the deoiled asphalt to the aromatic hydrocarbon is from 1:10 to 50:10; more preferably from 3:10 to 20:10.

Preferably, in step (2), the deoiled asphalt is obtained by subjecting a heavy oil feedstock to a solvent deasphalting process in a solvent deasphalting unit.

Preferably, in the solvent deasphalting unit, the yield of the deoiled asphalt is not more than 50 wt %, more preferably not more than 40 wt %, and still more preferably not more than 30 wt %.

Preferably, the process of the present invention further comprises: recycling the coker diesel and/or coker wax oil obtained in step (32) back to step (2) as at least a part of the aromatics-containing stream.

Preferably, in step (2), the first reaction unit is operated under conditions of: a reaction temperature of 280-450° C., a reaction pressure of 8.0-20.0 MPa, a volume ratio of hydrogen to oil of 400-2000, and a liquid hourly volume space velocity of 0.05-1.2 $h^{-1}$.

More preferably, the first reaction unit is operated under conditions of: a reaction temperature of 330-420° C., a reaction pressure of 10.0-18.0 MPa, a volume ratio of hydrogen to oil of 600-1200, and a liquid hourly volume space velocity of 0.10-0.8 $h^{-1}$. The liquid hourly volume space velocity and the reaction pressure are selected according to the characteristics of the material to be treated and the desired conversion and refining depth.

Unless otherwise specified, all pressures described herein are expressed as gauge pressures.

The hydrogenation catalyst of the present invention may be a graded combination of different catalysts, and preferably the hydrogenation catalyst is at least capable of catalyzing hydrodemetallization and hydrodesulfurization reactions.

According to the present invention, the specific type of catalyst capable of catalyzing the hydrodemetallization reaction, hydrodesulfurization reaction, hydrodeasphalting reaction, and hydrodecarbonization reaction is not particularly limited, and a catalyst capable of catalyzing the above reactions conventionally used in the art may be used.

The hydrogenation catalyst of the invention can, for example, use a porous refractory inorganic oxide as support, an oxide or sulfide of a metal from Group VIB and/or Group VIII as active component, and optionally with the addition of an auxiliary agent.

In one embodiment, the first reaction unit is a fixed bed hydrogenation unit, a moving bed-fixed bed hydrogenation combined unit, or a moving bed hydrogenation unit.

The invention further provides a first variant of the technical solution of the first aspect, which is described below.

In the first variant, the first reaction unit comprises a mineral-rich precursor material and/or a hydrogenation catalyst capable of catalyzing at least one reaction selected from hydrodemetallization reaction, hydrodesulfurization reaction, hydrodeasphalting reaction, and hydrodecarbonization reaction, wherein the mineral-rich precursor material is a material capable of adsorbing at least one metal selected from V, Ni, Fe, Ca, and Mg.

In one embodiment, the first reaction unit is a fixed bed hydrogenation unit.

Preferably, in step (2), the mineral-rich precursor material comprises a support and an active component element loaded on the support, wherein the support is at least one selected from the group consisting of aluminum hydroxide, alumina and silica, and the active component element is at least one metal element selected from the group consisting of Group VIB and Group VIII. More preferably, the active component in the mineral-rich precursor material is an oxide and/or sulphide of a metal element selected from Group VIB and Group VIII.

More preferably, in step (2), the mineral-rich precursor material has a loss on ignition of not less than 3 wt %, a specific surface area of not less than 80 $m^2/g$, and a water absorption of not less than 0.9 g/g. The loss on ignition refers to the percentage of the reduced weight of the mineral-rich precursor material after a roasting treatment at 600° C./2 h compared with the weight before the roasting; and the water absorption refers to the percentage of the increased weight of the mineral-rich precursor material after immersion in water for half an hour at room temperature (for example, 25° C.) compared with the weight before the immersion.

According to a preferred embodiment, in step (2), the first reaction unit is sequentially, following the reactant flow direction, charged with a first mineral-rich precursor material and a second mineral-rich precursor material, wherein the second mineral-rich precursor material has a loss on ignition equal to or greater than that of the first mineral-rich precursor material.

According to the preferred embodiment above, it is further preferred that the first mineral-rich precursor material has a loss on ignition of 3 to 15 wt %, and the second mineral-rich precursor material has a loss on ignition of not less than 15 wt %.

According to the preferred embodiment above, it is further preferred that the first mineral-rich precursor material and the second mineral-rich precursor material are loaded at a ratio by volume of from 5:95 to 95:5.

Preferably, after the first reaction unit of the invention is operated for a long period, the mineral-rich precursor material is converted into a vanadium-rich material, and the vanadium content in the vanadium-rich material is not less than 10 wt %.

Preferred embodiments for the first reaction unit of the present invention are provided below.

The technology for hydrotreating a feedstock involved in the first reaction unit of the invention is a fixed bed hydrotreating technology, taking the conventional hydrotreating technology of fixed bed for heavy oil and residual oil as an example, the reactor or the reaction bed layer at least comprises a mineral-rich precursor material and/or a hydrogenation catalyst, and the mineral-rich precursor material mainly composed by two parts: a support having strong capability of adsorbing vanadium-containing organic compounds in oil, and an active component having hydrogenation activity function. The support is primarily obtained by extruding, molding and drying silica, aluminum hydroxide or a mixture of aluminum hydroxide/alumina. The surface of the support is rich in-OH. The support has strong adsorption capacity on vanadium-containing organic compounds in oil. The support has a loss on ignition of not less than 5% after roasting at 600° C. for 2 hours. The active component mainly comprises an oxide or sulfide of metals of Group VIB and/or Group VIII such as W, Mo, Co, Ni and the like.

The hydrogenation catalyst involved in the foregoing preferred embodiment is generally a heavy residue hydrogenation catalyst, and the heavy residue hydrogenation catalyst refers to a combined catalyst having functions of heavy residue hydrodemetallization, hydrodesulfurization, hydrodecarbonization, and the like. For these catalysts, generally a porous refractory inorganic oxide such as alumina is used as the support, an oxide or sulfide of metal from Group VIB and/or Group VIII such as W, Mo, Co, Ni and the like is used as the active components, and other various auxiliaries such as elements P, Si, F, B and the like are optionally added, such as RDM, RCS series heavy metals, residual oil hydrodemetallization catalysts and desulfurization catalysts developed by RIPP. At present, in the fixed bed residual oil hydrogenation technology, a plurality of catalysts are often used together. In the present invention, a mineral-rich precursor material, a hydrodemetallation desulfurization catalyst and a hydrodesulfurization catalyst are preferably used, which are generally loaded in such a sequence that the feedstock is sequentially brought into contact with the mineral-rich precursor material, the hydrodemetallation desulfurization and the hydrodesulfurization catalyst. Of course, there are techniques of loading a mixture of these catalysts.

Preferably, in step (31), the second reaction unit is a hydrocracking unit, operated under conditions of: a reaction temperature of 330-420° C., a reaction pressure of 5.0-18.0 MPa, a volume ratio of hydrogen to oil of 500-2000, and a liquid hourly volume space velocity of 0.3-3.0 $h^{-1}$.

Preferably, the hydrocracking unit is loaded with at least one hydrotreating catalyst and at least one hydrocracking catalyst.

Preferably, the hydrocracking unit is a fixed bed hydrocracking unit.

Preferred embodiments in the second reaction unit of the present invention are provided below.

In the step (31), the first light component is introduced into a second reaction unit for reaction, using fixed bed hydrocracking technology. Taking the conventional technology of hydrocracking wax oil by fixed bed in industry as an example, the reactor or the reaction bed layer comprises at least two hydrocracking catalysts, namely a pretreatment catalyst and a hydrocracking catalyst. As the material obtained from fixed bed hydrotreatment followed by fractionation has high contents of metal, sulfur and nitrogen and high carbon residue value, the pretreatment catalyst preferably has strong demetallization activity and good desulfurization and denitrification activities, so as to ensure the activity of the subsequent hydrocracking catalyst. The hydrocracking catalyst preferably has good hydrocracking activity. For these catalysts, generally a porous refractory inorganic oxide such as alumina or molecular sieve is used as the support, an oxide or sulfide of metal from Group VIB and/or Group VIII such as W, Mo, Co, Ni and the like is used as the active components, and other various auxiliaries such as elements P, Si, F, B and the like are optionally added, such as RS series pretreatment catalysts and RHC series hydrocracking catalysts developed by RIPP. The RS series catalyst is a NiW catalyst, and the RHC series catalyst is a NiMo molecular sieve catalyst.

Preferably, in step (31), the second reaction unit is a catalytic cracking unit, and the catalytic cracking unit is a Fluid Catalytic Cracking (FCC) unit.

Preferably, the technology used for catalytic cracking the first light component is FCC technology, preferably LTAG technology developed by RIPP, and mainly produces gasoline fractions and liquefied gas.

Preferably, the fluid catalytic cracking unit is operated under conditions of: a reaction temperature of 500-600° C., a catalyst-to-oil ratio of 3-12, and a retention time of 1-10 s. More preferably, the fluid catalytic cracking unit is operated under conditions of: a reaction temperature of 520-580° C., a catalyst-to-oil ratio of 4-10, and a retention time of 2-5 s.

The catalyst-to-oil ratio of the invention denotes the weight ratio of the catalyst-to-oil.

Preferably, in step (31), the second reaction unit is a diesel hydrogenation upgrading unit, operated under conditions of: a reaction temperature of 330-420° C., a reaction pressure of 5.0-18.0 MPa, a volume ratio of hydrogen to oil of 500-2000, and a liquid hourly volume space velocity of 0.3-3.0 $h^{-1}$.

Preferably, the diesel hydrogenation upgrading unit is loaded with at least one diesel hydrogenation upgrading catalyst.

The diesel hydrogenation upgrading catalyst can be a combined catalyst with functions of diesel hydrodesulfurization, hydrodenitrogenation and the like. For these catalysts, generally a porous refractory inorganic oxide such as alumina is used as the support, an oxide or sulfide of metal from Group VIB and/or Group VIII such as W, Mo, Co, Ni and the like is used as the active components, and other various auxiliaries such as elements P, Si, F, B and the like are optionally added, such as RS series heavy metals, residual oil hydrodemetallization catalysts and desulfurization catalysts developed by RIPP.

Preferably, in step (32), the first heavy component is introduced into a delayed coking unit for reaction, to provide at least one product selected from coker gasoline, coker diesel, coker wax oil and low sulfur petroleum coke, wherein the delayed coking unit is operated under conditions of: a reaction temperature of 440-520° C., and a retention time of 0.1-4 h.

Preferably, in step (32), the sulfur content of the first heavy component is not greater than 1.8 wt %, the first heavy component is introduced into a delayed coking unit for reaction, to provide a low-sulfur petroleum coke. More preferably, the conditions in the delayed coking unit are controlled such that the sulfur content of the low-sulfur petroleum coke is not greater than 3 wt %.

Preferably, in step (32), the first heavy component is used as a low-sulfur ship fuel oil component, and the sulfur content of the low-sulfur ship fuel oil component is not more than 0.5 wt %.

According to the present invention, the specific operation of the solvent deasphalting treatment is not particularly limited, and a conventional solvent deasphalting process can be used. The operating parameters of the solvent deasphalting process are exemplified in Examples of the present invention, which should not be understood by those skilled in the art as limiting the invention.

The process of the present invention is suitable for the hydro-conversion of atmospheric residue and vacuum residue, in particular for the hydro-conversion of poor residual oil having high contents of metals (Ni+V>150 µg/g, especially Ni+V>200 µg/g), high contents of carbon residue (weight fraction of carbon residue >17%, especially weight fraction of carbon residue >20%) and high contents of fused ring sub stances.

In one embodiment, the hydrogenation catalyst is capable of catalyzing at least one reaction selected from the group consisting of a hydrodemetallization reaction, a hydrodesulfurization reaction, a hydrodeasphalting reaction, and a hydrodecarbonization reaction, and the mineral-rich precursor material is a material capable of adsorbing at least one metal selected from the group consisting of V, Ni, Fe, Ca, and Mg.

An exemplary embodiment of the first variant of the technical solution of the first aspect can be seen in FIG. 1.

The process for hydrotreating deoiled asphalt of the first variant is described in further detail below with reference to FIG. 1.

As shown in FIG. 1, the heavy oil feedstock 1 is fed into solvent deasphalting unit 2 to provide the deoiled asphalt 4 and the deasphalted oil 3 through solvent deasphalting treatment; the deoiled asphalt 4 and the aromatics-containing stream 5 are mixed to form a mixed feedstock 6 which is fed into the first reaction unit 7 for hydrogenation reaction, wherein the first reaction unit comprises a mineral-rich precursor material and/or a hydrogenation catalyst, and the first reaction unit is a fixed bed hydrogenation unit; the liquid phase product from the first reaction unit 7 is fed into a separation unit 19 for fractionation to provide a first light component 8 and a first heavy component 9; the first light component 8 is fed into a second reaction unit 10 for reaction, to provide at least one product selected from a gasoline component 13, a BTX feedstock component 12 and a diesel component 14; and the first heavy component 9 is fed into a delayed coking unit 11 for reaction, to provide at least one product selected from the group consisting of coker gasoline 15, coker diesel 16, coker wax oil 17 and low sulfur petroleum coke 18; or the first heavy component 9 is used as a low sulfur ship fuel oil component.

The description and/or definition for features in the first variant of the technical solution of the first aspect may apply to various variants of the first aspect of the invention, as well as to other aspects and various variants thereof, unless there is a different or more specific description and/or definition in the other aspects or various variants thereof. Similarly, descriptions and/or definitions for various features of various variants of the first aspect of the invention, as well as of other various aspects and of various variants thereof (particularly features not specifically described and/or defined in this first variant), may be used in the first variant of the first aspect, unless there is a different or more specific description and/or definition in the first variant of the first aspect.

The invention further provides a second variant of the technical solution of the first aspect, which is described below.

In this second variant, the first reaction unit of the invention is a moving bed-fixed bed hydrogenation combined unit or a moving bed hydrogenation unit. In a first preferred case, the first reaction unit is a moving bed-fixed bed hydrogenation combined unit; in a second preferred aspect, the first reaction unit is a moving bed hydrogenation unit.

According to the invention, the first reaction unit is particularly preferably a moving bed-fixed bed hydrogenation combined unit.

According to a preferred embodiment, in step (2), the first reaction unit is a moving bed-fixed bed hydrogenation combined unit, and the moving bed is loaded with a mineral-rich precursor material; and the fixed bed is sequentially loaded with a mineral-rich precursor material and a hydrogenation catalyst, or the fixed bed is loaded with a hydrogenation catalyst.

Preferably, in step (2), the first reaction unit is a moving bed-fixed bed hydrogenation combined unit, and the moving bed is sequentially loaded with a mineral-rich precursor material and a hydrogenation catalyst; and the fixed bed is sequentially loaded with a mineral-rich precursor material and a hydrogenation catalyst, or the fixed bed is loaded with a hydrogenation catalyst.

In the preferred embodiments above, more preferably, the ratio of the volume of the mineral-rich precursor material loaded in the moving bed to the sum of the volumes of the mineral-rich precursor material and the hydrogenation catalyst loaded in the fixed bed is from 10:90 to 60:40, preferably from 20:80 to 40:60. It should be explained that, when only a hydrogenation catalyst is loaded in the fixed bed, the above loaded volume ratio represents: the ratio of the volume of the mineral-rich precursor material loaded in the moving bed to the volume of the hydrogenation catalyst loaded in the fixed bed.

Preferably, the process of the present invention further comprises: replacing the mineral-rich precursor material loaded in the moving bed with a fresh mineral-rich precursor material per each period, wherein the replacement proportion accounts for 5-20 wt %, more preferably 10-15 wt %, relative to the total amount of the mineral-rich precursor material loaded in the moving bed.

Preferably, the period is 5-20 days, preferably 10-15 days.

The mineral-rich precursor material of the present invention can be cylindrical and/or spherical in shape, preferably spherical.

Preferably, the mineral-rich precursor material has an average particle size of 0.1 to 6 mm, more preferably 0.3 to 4 mm, and still more preferably 0.5 to 1.5 mm.

The fresh mineral-rich precursor material used for replacing the mineral-rich precursor material loaded in the moving bed is in oxidized state or vulcanized state, preferably vulcanized state.

According to a preferred embodiment, in step (2), the first reaction unit is sequentially loaded with a first mineral-rich precursor material and a second mineral-rich precursor material, in terms of the reactant flow direction, and the second mineral-rich precursor material has a loss on ignition equal to or greater than that of the first mineral-rich precursor material. According to the present invention, the specific loading positions of the first and second mineral-rich precursor materials are not particularly limited, as long as they can achieve: relative to the second mineral-rich precursor material, the reaction materials being firstly contacted with the first mineral-rich precursor material and then contacted with the second mineral-rich precursor material.

In this second variant, the feedstock hydrotreating technology involved in the first reaction unit of the invention is a moving bed-fixed bed hydrotreating technology or a moving bed hydrotreating technology. The moving bed reactor is loaded with spherical mineral-rich precursor materials, having an average particle size of 0.1-6 mm. The fixed bed reaction bed layer comprises at least a mineral-rich precursor material and/or a hydrogenation catalyst, where the mineral-rich precursor material mainly comprises two parts: one part of support having strong capability of adsorbing vanadium-containing organic compounds in oil, and the other part of active component having hydrogenation activity function. The reactor or the reaction bed layer comprises at least a mineral-rich precursor material and a hydrogenation catalyst, where the mineral-rich precursor material mainly comprises two parts: one part of support having strong capability of adsorbing vanadium-containing organic compounds in oil, and the other part of active component having hydrogenation activity function.

Figure 2:
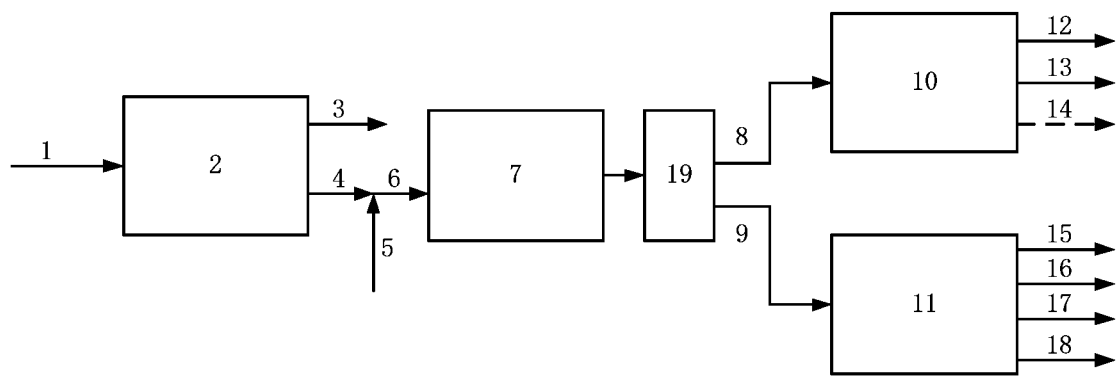
FIG. 2 is a flow chart of a process for hydrotreating deoiled asphalt according to an embodiment of the second variant of the first aspect of the present invention.

An exemplary embodiment of the second variant of the first aspect can be seen in FIG. 2.

The description and/or definition for features in the second variant of the technical solution of the first aspect may apply to various variants of the first aspect of the invention, as well as to other aspects and various variants thereof, unless there is a different or more specific description and/or definition in the other aspects or various variants thereof. Similarly, descriptions and/or definitions for various features of various variants of the first aspect of the invention, as well as of other various aspects and of various variants thereof (particularly features not specifically described and/or defined in this second variant), may be used in the second variant of the first aspect, unless there is a different or more specific description and/or definition in the second variant of the first aspect.

The invention further provides a third variant of the technical solution of the first aspect, which is described below.

According to this third variant, the process of the invention further comprises:
(1) introducing a heavy raw oil into the solvent deasphalting unit for solvent deasphalting treatment, to provide a deoiled asphalt and a deasphalted oil;
(11) introducing the deasphalted oil into a third hydrogenation unit for hydrogenation reaction, and introducing a liquid phase effluent obtained in the third hydrogenation unit into a DCC unit for reaction, to provide propylene, LCO, HCO and slurry oil, wherein the third hydrogenation unit is a fixed bed hydrogenation unit;
(13) introducing the slurry oil obtained in the DCC unit into a fourth hydrogenation unit for demetallization reaction, to provide demetallized slurry oil; and
using an aromatics-containing stream comprising the slurry obtained in the DCC unit and/or the demetallized slurry obtained in the fourth hydrogenation unit as the aromatics-containing stream (5) in step (2) in the first variant or in the second variant, preferably in the first variant.

When the slurry oil obtained in the DCC unit and the deoiled asphalt obtained in the solvent deasphalting unit are introduced into the first hydrogenation unit for conversion reaction, the slurry oil can be subjected to filtration or not, and is preferably subjected to filtration, so that the solid content is controlled to be 10 ppm.

Preferably, said aromatics-containing stream also comprises aromatics-rich fraction oil, said aromatics-rich fraction oil comprising the LCO and/or the HCO obtained in the DCC unit.

Preferably, in step (11), the operation conditions in the DCC unit are controlled such that the aromatic content of the LCO and/or HCO is equal to or greater than 60 wt %.

Preferably, the cutting point of the LCO and the HCO is 180-205° C.; preferably, the cutting point of the HCO and the slurry oil is 330-360° C.

This third variant provides the following preferred embodiments for the solvent deasphalting unit:

Preferably, in step (1), the deoiled asphalt from the solvent deasphalting unit has a yield of not more than 50 wt %, more preferably not more than 40 wt %, and still more preferably not more than 30 wt %.

Preferably, in step (1), the heavy raw oil is residual oil and/or heavy oil.

According to the third variant, the specific operation of the solvent deasphalting treatment is not particularly limited and can be carried out by a solvent deasphalting processes conventionally known in the art. This third variant does not list the specific operating parameters for the solvent deasphalting process and the skilled person should not be understood as a limitation to this third variant.

This third variant provides the following preferred embodiments for the third hydrogenation unit:

Preferably, in step (11), the third hydrogenation unit is operated under conditions of: a reaction temperature of 280-400° C., a reaction pressure of 6.0-14.0 MPa, a volume ratio of hydrogen to oil of 600-1200, and a liquid hourly space velocity of 0.3-2.0 h$^{-1}$.

Preferably, in step (11), the third hydrogenation unit is loaded with at least two hydrogenation catalysts. More preferably, in step (11), the hydrogenation catalyst is a catalyst capable of catalyzing at least one reaction selected from the group consisting of a hydrodemetallization reaction, a hydrodesulfurization reaction, and a hydrodecarbonization reaction. The hydrogenation catalyst is generally supported on a porous refractory inorganic oxide, such as alumina. Particularly preferably, in step (11), the hydrogenation catalyst comprises alumina as a support and a metal element from Group VIB and/or Group VIII as an active component element, and optionally also comprises at least one auxiliary element selected from P, Si, F and B. In the hydrogenation catalyst, the metal elements from Group VIB and Group VIII may be, for example, W, Mo, Co, Ni, or the like. In the hydrogenation catalyst, the active component may be an oxide and/or a sulfide of the above-mentioned active component element.

Preferred embodiments for the third hydrogenation unit of this third variant are provided below.

The conditions of the third hydrogenation unit for deasphalted oil (DAO) in the presence of hydrogen are generally as follows: the hydrotreating technology of DAO is fixed bed hydrotreating technology. Taking the currently industrial fixed bed heavy and residual oil hydrogenation technology as an example, the reactor or the reaction bed layer comprises at least two hydrogenation catalysts, and the heavy and residual oil hydrogenation catalyst refers to a combined catalyst with the functions of hydrodemetallization, hydrodesulfurization, hydrodenitrogenation, hydrodecarbonization and the like for both heavy oil and residual oil. For these catalysts, generally a porous refractory inorganic oxide such as alumina is used as the support, an oxide or sulfide of metal from Group VIB and/or Group VIII such as W, Mo, Co, Ni and the like is used as the active components, and other various auxiliaries such as elements P, Si, F, B and the like are optionally added, such as RDM, RCS series heavy metals, residual oil hydrodemetallization catalysts and desulfurization catalysts developed by RIPP. At present, in the fixed bed residual oil hydrogenation technology, a plurality of catalysts are often used together. A hydrodemetallization catalyst, a hydrodesulfurization catalyst and a hydrodenitrogenation catalyst are used, with such a general loading sequence that the raw oil is sequentially contacted with the hydrodemetallization catalyst, the hydrodesulfurization catalyst and the hydrodenitrogenation catalyst, and sometimes one or two catalysts are absent according to the situation. For example, only the hydrodemetallization catalyst and the hydrodesulfurization catalyst are loaded, but the hydrodenitrogenation catalyst is not loaded. Of course, there is a technology of loading these catalysts as a mixture. The liquid hourly volume space velocity and the reaction pressure are generally selected according to the nature of the materials to be treated and the desired conversion and depth of purification.

This third variant provides the following preferred embodiments for the second reaction unit.

Preferably, in step (31), the second reaction unit is a fixed bed hydrocracking unit; preferably, the fixed bed hydrocracking unit is loaded with at least two catalysts; the catalyst generally comprises a porous refractory inorganic oxide such as alumina as a support; and preferably, the catalyst loaded in the fixed bed hydrocracking unit comprises alumina as a support and a metal element from Group VIB and/or Group VIII as an active component element, and the catalyst optionally further comprises at least one auxiliary element selected from P, Si, F and B. The metal elements from Group VIB and Group VIII in the catalyst may be, for example, W, Mo, Co, Ni, and the like. Also, in the catalyst, the active component may be an oxide and/or sulfide of the above-mentioned active component element. Particularly preferably, in step (31), the second reaction unit is sequentially loaded with a pretreated catalyst and a hydrocracking catalyst in the direction of reactant flow.

Preferably, the second reaction unit is a fixed bed hydrocracking unit and the second reaction unit is operated under conditions of: a reaction temperature of 330-420° C., a reaction pressure of 5.0-18.0 MPa, a volume ratio of hydrogen to oil of 500-2000, and a liquid hourly volume space velocity of 0.3-3.0 h$^{-1}$. More preferably, the second reaction unit is sequentially loaded with a pretreated catalyst and a hydrocracking catalyst in the direction of reactant flow.

According to a preferred embodiment, in step (31), the second reaction unit is a catalytic cracking unit and the catalytic cracking unit is a fluidized catalytic cracking unit.

This third variant provides the following preferred embodiments for the fourth hydrogenation unit.

Preferably, in step (13), the fourth hydrogenation unit is a fixed bed hydrogenation unit, and the fourth hydrogenation unit is operated under conditions of: a reaction temperature of 200-280° C., a reaction pressure of 3.0-6.0 MPa, a volume ratio of hydrogen to oil of 600-1200, and a liquid hourly space velocity of 0.5-2.5 h$^{-1}$.

Preferably, in step (13), the fourth hydrogenation unit is loaded with at least two hydrogenation catalysts; more preferably, in step (13), the hydrogenation catalyst is a catalyst capable of catalyzing at least one reaction selected from the group consisting of a hydrodemetallization reaction, a hydrodesulfurization reaction, and a hydrodecarbonization reaction; the hydrogenation catalyst generally comprises a porous refractory inorganic oxide such as alumina as a support; and particularly preferably, in step (13), the hydrogenation catalyst comprises alumina as a support and a metal element from Group VIB and/or Group VIII as an active component element, and the hydrogenation catalyst optionally further comprises at least one auxiliary element selected from P, Si, F and B. In step (13), in the hydrogenation catalyst, the metal elements from Group VIB and Group VIII may be, for example, W, Mo, Co, Ni, or the like. In the hydrogenation catalyst, the active component may be an oxide and/or a sulfide of the above-mentioned active component element.

A preferred embodiment in the fourth hydrogenation unit of this third variant is provided below.

The hydrotreating technology for the slurry oil is a low-pressure fixed bed hydrotreating technology. Taking the currently industrial fixed bed heavy and residual oil hydrogenation technology as an example, the reactor or the reaction bed layer comprises at least two hydrogenation catalysts, and the heavy and residual oil hydrogenation catalyst refers to a combined catalyst with the functions of asphaltene conversion of heavy and residual oil, and hydrodemetallization, hydrodesulfurization, hydrodenitrogenation, hydrodecarbonization and the like for both heavy oil and residual oil. For these catalysts, generally a porous refractory inorganic oxide such as alumina is used as the support, an oxide or sulfide of metal from Group VIB and/or Group VIII such as W, Mo, Co, Ni and the like is used as the active components, and other various auxiliaries such as elements P, Si, F, B and the like are optionally added, such as RDM, RCS series heavy metals, residual oil hydrodemetallization catalysts and desulfurization catalysts developed by RIPP. At present, in the fixed bed residual oil hydrogenation technology, a plurality of catalysts are often used together. A hydrodemetallization catalyst, a hydrodesulfurization catalyst and a hydrodenitrogenation catalyst are used, with such a general loading sequence that the raw oil is sequentially contacted with the hydrodemetallization catalyst, the hydrodesulfurization catalyst and the hydrodenitrogenation catalyst, and sometimes one or two catalysts are absent according to the situation. For example, only the hydrodemetallization catalyst and the hydrodesulfurization catalyst are loaded, but the hydrodenitrogenation catalyst is not loaded. Of course, there are techniques of loading a mixture of these catalysts. The liquid hourly volume space velocity and the reaction pressure are generally selected according to the nature of the material to be treated and the desired conversion and depth of purification.

Figure 3:
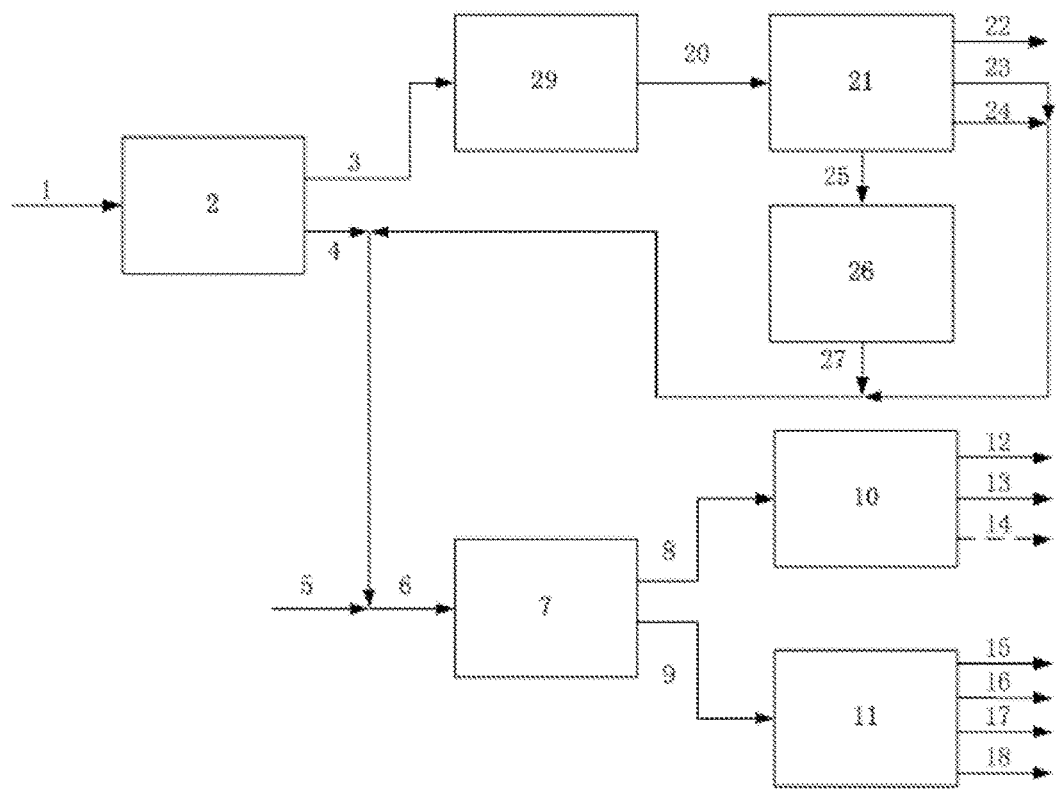
FIG. 3 is a flow chart of a process for hydrotreating deoiled asphalt according to an embodiment of the third variant of the first aspect of the present invention.

The process of processing a heavy oil feedstock of the third variant is described in further detail below referring to FIG. 3.

As shown in FIG. 1, a heavy oil feedstock 1 is fed into a solvent deasphalting unit 2 for solvent deasphalting treatment to provide the deoiled asphalt 4 and the deasphalted oil 3 through solvent deasphalting treatment; the deasphalted oil 3 is fed into a third hydrogenation unit 29 for hydrogenation reaction, and the liquid phase effluent 20 obtained in the third hydrogenation unit is fed into a DCC unit 21 for reaction, to provide propylene 22, LCO 23, HCO 24 and slurry oil 25, wherein the third hydrogenation unit is a fixed bed hydrogenation unit; the slurry oil 25 obtained in the DCC unit 21 is fed into a fourth hydrogenation unit 26 for demetallization reaction, to provide a demetallized slurry oil 27; a mixed feedstock 6, formed from an aromatics-containing stream together with the deoiled asphalt 4 obtained in the solvent deasphalting unit 2, is fed into the first hydrogenation unit 7 for conversion reaction, wherein the aromatics-containing stream comprises at least one selected from the group consisting of LCO 23 obtained in the DCC unit 21, HCO 24 obtained in the DCC unit 21, demetallized slurry 27 obtained in the fourth hydrogenation unit 26, and aromatic compounds 5 from the outside, the first hydrogenation unit being a fixed bed hydrogenation unit or a moving bed hydrogenation unit; the liquid phase effluent obtained in the first hydrogenation unit 7 is separated, and the first light component 8 obtained by separation is fed into a second reaction unit 10 for reaction, to provide at least one product selected from the group consisting of a gasoline component 13, a diesel component 14 and a BTX feedstock component 12, or at least part of the first light component 8 is recycled back to the DCC unit 21; and the first heavy component 9 obtained by separation is fed into a delayed coking unit 11 for reaction, to provide at least one product selected from the group consisting of coker gasoline 15, coker diesel 16, coker wax oil 17 and low-sulfur petroleum coke 18; or the first heavy component 9 is used as a low sulfur ship fuel oil component.

The description and/or definition for features in the third variant of the technical solution of the first aspect may apply to various variants of the first aspect of the invention, as well as to other aspects and various variants thereof, unless there is a different or more specific description and/or definition in the other aspects or various variants thereof. Similarly, descriptions and/or definitions for various features of various variants of the first aspect of the invention, as well as of other various aspects and of various variants thereof (particularly features not specifically described and/or defined in this third variant), may be used in the third variant of the first aspect, unless there is a different or more specific description and/or definition in the third variant of the first aspect.

The invention further provides a fourth variant of the technical solution of the first aspect, which is described below.

The fourth variant is substantially similar to the third variant, with the main differences that: the LCO and/or HCO obtained in the DCC unit is incorporated into the aromatics-containing stream (5) in step (2), and the slurry oil (25) is not subjected to the fourth hydrogenation unit in step (13), but is recycled to the solvent deasphalting unit for solvent deasphalting.

When recycling the first light component back to the DCC unit, it is preferred that the recycle ratio is from 0.1 to 0.5:1.

The process of processing a heavy oil feedstock of the present invention is described in further detail below with reference to FIG. 4.

Figure 4:
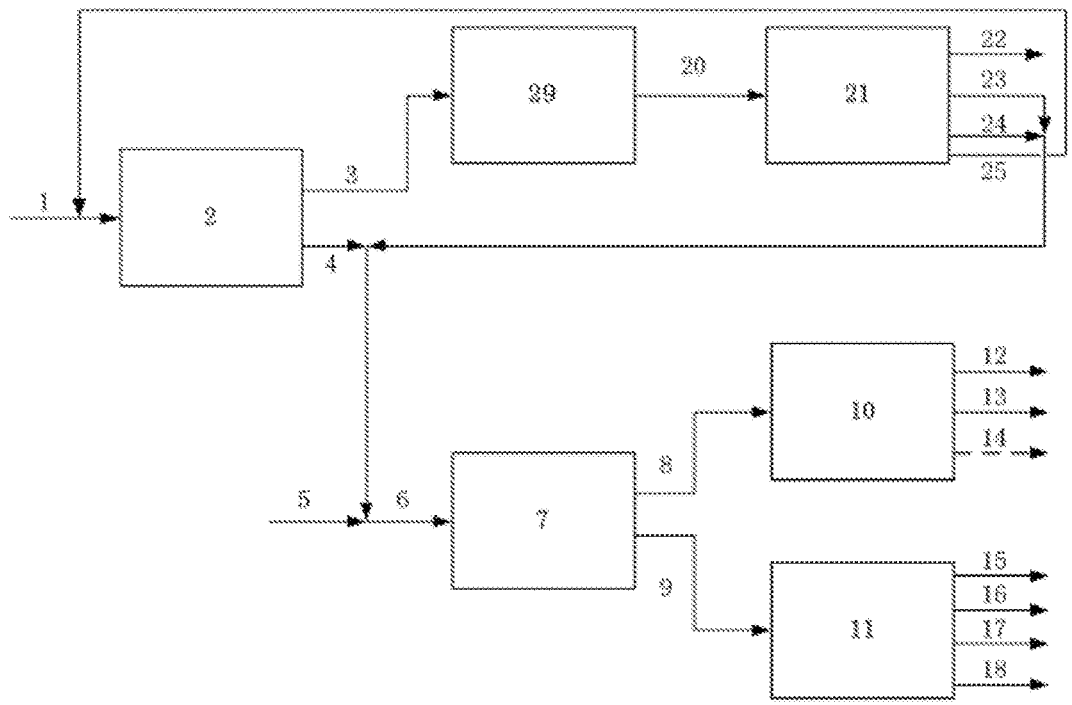
FIG. 4 is a flow chart of a process for hydrotreating deoiled asphalt according to an embodiment of the fourth variant of the first aspect of the present invention.

As shown in FIG. 4, the heavy raw oil 1 is fed into a solvent deasphalting unit 2 to provide deoiled asphalt 4 and deasphalted oil 3 through solvent deasphalting treatment; the deasphalted oil 3 is fed into a third hydrogenation unit 29 for hydrogenation reaction, and a liquid phase effluent 20 obtained in the third hydrogenation unit is fed into a DCC unit 21 for reaction, to provide propylene 22, LCO 23, HCO 24 and slurry oil 25, wherein the third hydrogenation unit is a fixed bed hydrogenation unit; LCO 23 and/or HCO 24 obtained in the DCC unit 21 and the deasphalted pitch 4 obtained in the solvent deasphalting unit 2 are mixed to form a mixed feedstock 6 which is fed into the first hydrogenation unit 7 for conversion reaction, wherein the aromatics-containing stream is at least one selected from the group consisting of LCO 23 from DCC unit 21, HCO 24 from DCC unit 21, and aromatic hydrocarbon 5 from the outside, and wherein the first hydrogenation unit 7 is a fixed bed hydrogenation unit or a moving bed hydrogenation unit; the liquid phase effluent obtained in the first hydrogenation unit 7 is separated, and the first light component 8 obtained by separation is fed into a second reaction unit 10 for reaction, to provide at least one product selected from the group consisting of a gasoline component 13, a diesel component 14 and a BTX feedstock component 12, or at least part of the first light component 8 is recycled back to the DCC unit 21; and the first heavy component 9 is fed into a delayed coking unit 11 for reaction to provide at least one product selected from the group consisting of coker gasoline 15, coker diesel 16, coker wax oil 17 and low sulfur petroleum coke 18; or the first heavy component 9 is used as a low sulfur ship fuel oil component.

The description and/or definition for features in the fourth variant of the technical solution of the first aspect may apply to various variants of the first aspect of the invention, as well as to other aspects and various variants thereof, unless there is a different or more specific description and/or definition in the other aspects or various variants thereof. Similarly, descriptions and/or definitions for various features of various variants of the first aspect of the invention, as well as of other various aspects and of various variants thereof (particularly features not specifically described and/or defined in this fourth variant), may be used in the fourth variant of the first aspect, unless there is a different or more specific description and/or definition in the fourth variant of the first aspect.

The invention further provides a fifth variant of the technical solution of the first aspect, which is described below.

The fifth variant comprises:

Step (16): introducing an aromatics-rich fraction oil into a fifth reaction unit for hydrosaturation, followed by fractionation, to provide a second light component and a second heavy component, wherein the second light component and the second heavy component has a cutting point of 100-250° C., and the aromatic content in the second heavy component is more than or equal to 20 wt %; and incorporating the second heavy component into the aromatics-containing stream (5) in step (2) of any one of the first to fourth variants, preferably the first variant.

Preferably, the hydrosaturation reaction carried out in the fifth reaction unit of the fifth variant is a partial hydrosaturation, and particularly preferably that the second light component and the second heavy component has a the cutting point of 180° C.

The second light component is preferably fed into a catalytic cracking unit to produce lower olefins.

Preferably, in step (16), the fifth reaction unit is at least one reactor of a fixed bed reactor, a moving bed reactor and an boiling bed reactor.

Preferably, the fifth reaction unit is operated under conditions of: a reaction temperature of 200-420° C., a reaction pressure of 2-18 MPa, a liquid hourly space velocity of 0.3-10 h$^{-1}$, and a volume ratio of hydrogen to oil of 50-5000. More preferably, the fifth reaction unit is operated under conditions of: a reaction temperature of 220-400° C., a reaction pressure of 2-15 MPa, a liquid hourly space velocity of 0.3-5 h$^{-1}$, and a volume ratio of hydrogen to oil of 50-4000.

Preferred embodiments for the fifth reaction unit of this fifth variant are provided below.

The partial hydrosaturation of the aromatics-rich fraction oil in the presence of hydrogen is generally operated under conditions of: the partial hydrosaturation technology for the aromatics-rich fraction oil being a fixed bed/boiled bed/moving bed hydrotreating technology. Taking the currently industrial fixed bed diesel or wax oil hydrogenation technology as an example, the reactor or the reaction bed layer comprises at least a hydrofining catalyst. The hydrofining catalyst used in the partial hydrosaturation of the aromatics-rich fraction oil preferably has good and moderate hydrosaturation activity, to avoid further saturation of a tetralin-like structure to a decahydronaphthalene or cycloalkane structure with lower hydrogen donating ability. For these catalysts, generally a porous refractory inorganic oxide such as alumina or molecular sieve is used as the support, an oxide or sulfide of metal from Group VIB and/or Group VIII such as W, Mo, Co, Ni and the like is used as the active components, and other various auxiliaries such as elements P, Si, F, B and the like are optionally added, such as RS series pretreatment catalysts developed by RIPP. The RS series catalyst is a NiMo catalyst.

The first reaction unit for the fifth variant is preferably a medium/low pressure fixed bed hydrogenation unit.

Preferably, in step (2), the first reaction unit is operated under conditions of: a reaction temperature of 260-500° C., a reaction pressure of 2.0-20.0 MPa, preferably of 2-12 MPa, a volume ratio of hydrogen to oil of 100-1200, and a liquid hourly space velocity of 0.1-1.5 $h^{-1}$. The liquid hourly volume space velocity and the reaction pressure are selected according to the nature of the materials to be treated and the desired conversion and refining depth.

The process of processing an aromatics-rich fraction oil according to the invention is described in further detail below with reference to FIG. 5.

Figure 5:
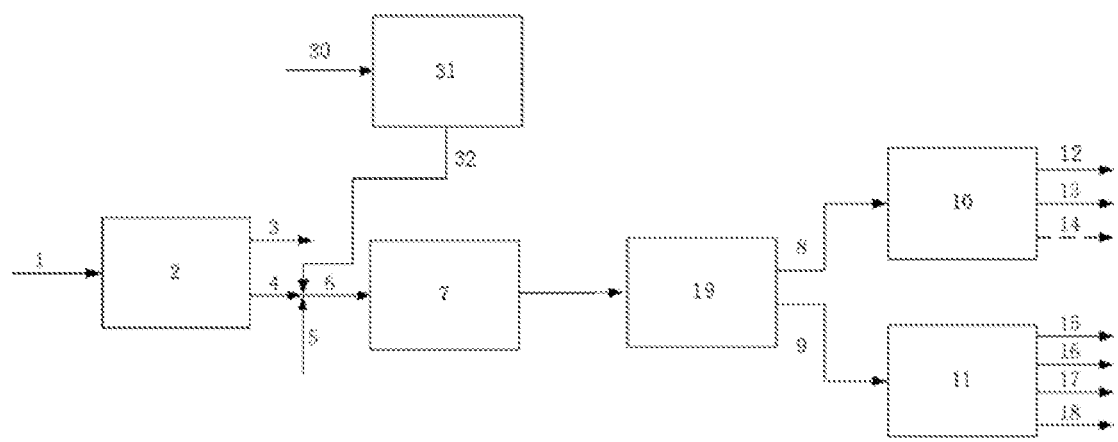
FIG. 5 is a flow chart of a process for hydrotreating deoiled asphalt according to an embodiment of the fifth variant of the first aspect of the present invention.

As shown in FIG. 5, an aromatics-rich fraction oil 30 is fed into a fifth reaction unit 31 for hydrosaturation, followed by fractionation, to provide a second light component and a second heavy component 32; and a heavy oil feedstock 1 is fed into a solvent deasphalting unit 2 for solvent deasphalting treatment to provide a deoiled asphalt 4 and deasphalted oil 3; the deoiled asphalt 4 and the aromatics-containing stream comprising the second heavy component 32 are mixed to form a mixed feedstock 6, which is fed into a first reaction unit 7 for hydrogenation reaction, wherein the aromatics-containing stream preferably also comprises aromatic hydrocarbons 5 from the outside, and wherein the first reaction unit comprises a mineral-rich precursor material and a hydrogenation catalyst capable of catalyzing at least one reaction selected from hydrodemetallization reaction, hydrodesulfurization reaction, hydrodeasphalting reaction and hydrodecarbonization reaction, and the first reaction unit is a fixed bed hydrogenation unit; the liquid-phase product from the first reaction unit 7 is fed into a separation unit 19 for fractionation, to provide a first light component 8 and a first heavy component 9, wherein the first light component and the first heavy component have a cutting point of 240-450° C.; the first light component 8 is fed into a second reaction unit 10 for reaction, to provide at least one product selected from a gasoline component 13, a BTX feedstock component 12 and a diesel component 14, wherein the second reaction unit is at least one selected from a hydrocracking unit, a catalytic cracking unit and a diesel hydrogenation upgrading unit; and the first heavy component 9 is fed into a delayed coking unit 11 for reaction, to provide at least one product selected from the group consisting of coker gasoline 15, coker diesel 16, coker wax oil 17 and low sulfur petroleum coke 18; or the first heavy component 9 is used as a low sulfur ship fuel oil component.

The description and/or definition for features in the fifth variant of the technical solution of the first aspect may apply to various variants of the first aspect of the invention, as well as to other aspects and various variants thereof, unless there is a different or more specific description and/or definition in the other aspects or various variants thereof. Similarly, descriptions and/or definitions for various features of various variants of the first aspect of the invention, as well as of other various aspects and of various variants thereof (particularly features not specifically described and/or defined in this fifth variant), may be used in the fifth variant of the first aspect, unless there is a different or more specific description and/or definition in the fifth variant of the first aspect.

The invention further provides a sixth variant of the technical solution of the first aspect, which is described below.

This sixth variant comprises:
(1) introducing a heavy raw oil into a solvent deasphalting unit for solvent deasphalting treatment, to provide a deoiled asphalt and a deasphalted oil;
(14) introducing the deasphalted oil into a sixth hydrogenation unit for hydrogenation reaction, and introducing the liquid phase effluent obtained in the sixth hydrogenation unit into a DCC unit for reaction, to provide propylene, LCO, HCO and slurry oil, wherein the sixth hydrogenation unit is a fixed bed hydrogenation unit; and
incorporating the LCO and/or HCO from the DCC unit into the aromatics-rich fraction oil in step (16) or using the LCO and/or HCO as the aromatics-rich fraction oil in step (16) of the fifth variant.

Thus, in one embodiment, step (1) in the sixth variant involves features substantially same as those described for step (1) in the third variant.

Further, in one embodiment, step (14) in the sixth variant involves features substantially same as those described for step (11) in the third variant.

Preferably, the DCC unit of the sixth variant is operated under conditions of: a reaction temperature of 500-650° C., a catalyst-to-oil ratio of 3-12, and a retention time of 0.6-6 s.

In one embodiment, for the sixth variant it is preferable that the LCO the said HCO have a cutting point of 300 to 400° C.; and the HCO and the slurry oil have a cutting point of 400-500° C.

In one embodiment, the sixth variant further comprises: recycling the coker diesel and/or the coker wax oil obtained in step (32) to the fifth hydrogenation unit for hydrosaturation.

In one embodiment, in step (14) of this sixth variant, the sixth hydrogenation unit is operated under conditions of: a reaction temperature of 280-400° C., a reaction pressure of 6.0-14.0 MPa, a volume ratio of hydrogen to oil of 600-1200, and a liquid hourly space velocity of 0.3-2.0 $h^{-1}$.

In one embodiment, in step (14) of this sixth variant, the sixth hydrogenation unit is loaded with at least two hydrogenation catalysts.

In one embodiment, in step (14) of the sixth variant, the hydrogenation catalyst is a catalyst capable of catalyzing at least one reaction selected from the group consisting of a hydrodemetallization reaction, a hydrodesulfurization reaction, and a hydrodecarbonization reaction.

In one embodiment, in step (14) of the sixth variant, the hydrogenation catalyst comprises alumina as the support and a metal element from Group VIB and/or Group VIII as an active component element, and optionally at least one auxiliary element selected from P, Si, F and B.

Figure 6:
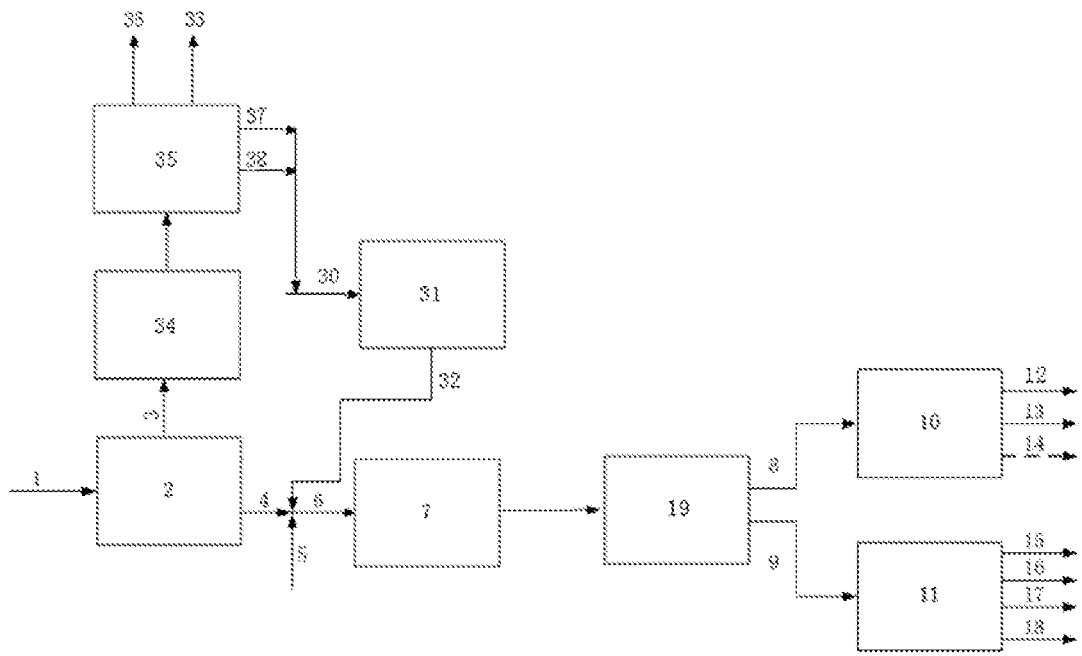
FIG. 6 is a flow chart of a process for hydrotreating deoiled asphalt according to an embodiment of the sixth variant of the first aspect of the present invention.

The process for processing the heavy raw oil and the aromatics-rich fraction oil according to the sixth modification will be described in further detail below with reference to FIG. 6.

As shown in FIG. 1, a heavy oil feedstock 1 is fed into a solvent deasphalting unit 2 for solvent deasphalting treatment to provide a deoiled asphalt 4 and a deasphalted oil 3; the deasphalted oil 3 is fed into a sixth hydrogenation unit 24 for hydrogenation reaction, and a liquid phase effluent obtained in the sixth hydrogenation unit 24 is fed into a DCC unit 35 for reaction, to provide propylene 36, LCO 37, HCO

38 and slurry oil 33; an aromatics-rich fraction oil 30 comprising the LCO 37 and/or the HCO 38 is fed into a fifth hydrogenation unit 31 for hydrosaturation, followed by fractionation, to provide a second heavy component 32 and a second light component; a mixed feedstock 6, formed from the deoiled asphalt 4 and the aromatics-containing stream comprising the second heavy component 32, is fed into a first reaction unit 7 for hydrogenation reaction, and the aromatics-containing stream preferably also comprises aromatic hydrocarbons 5 from the outside, wherein the first reaction unit 7 comprises a mineral-rich precursor material and a hydrogenation catalyst capable of catalyzing at least one reaction selected from hydrodemetallization reaction, hydrodesulfurization reaction, hydrodeasphalting reaction and hydrodecarbonization reaction; the liquid phase product from the first reaction unit 7 is fed into a separation unit 19 for fractionation, to provide a first light component 8 and a first heavy component 9; the first light component 8 is fed into a second reaction unit 10 for reaction, to provide at least one product selected from the group consisting of a gasoline component 13, a BTX feedstock component 12, a diesel component 14, or at least a portion of the first light component 8 is recycled back to the DCC unit 35; and the first heavy component 9 is fed into a delayed coking unit 11 for reaction, to provide at least one product selected from the group consisting of coker gasoline 15, coker diesel 16, coker wax oil 17 and low sulfur petroleum coke 18; or the first heavy component 9 is used as a low sulfur ship fuel oil component.

The description and/or definition for features in the sixth variant of the technical solution of the first aspect may apply to various variants of the first aspect of the invention, as well as to other aspects and various variants thereof, unless there is a different or more specific description and/or definition in the other aspects or various variants thereof. Similarly, descriptions and/or definitions for various features of various variants of the first aspect of the invention, as well as of other various aspects and of various variants thereof (particularly features not specifically described and/or defined in this sixth variant), may be used in the sixth variant of the first aspect, unless there is a different or more specific description and/or definition in the sixth variant of the first aspect.

As previously stated, a second aspect of the invention provides a system for hydrotreating deoiled asphalt, the system of a first variant of the second aspect comprising:

a first reaction unit, which is a fixed bed hydrogenation unit and is used for carrying out a hydrogenation reaction for a deoiled asphalt and an aromatics-containing stream therein;

a separation unit in fluid communication with the first reaction unit, for fractionating a liquid phase product from the first reaction unit therein;

a second reaction unit in fluid communication with the separation unit, for reaction therein of the first light component obtained in the separation unit, wherein the second reaction unit is at least one selected from the group consisting of a hydrocracking unit, a catalytic cracking unit, and a diesel hydro-upgrading unit;

a delayed coking unit in fluid communication with the separation unit, for reaction therein of the first heavy component obtained from the separation unit, to provide at least one product selected from the group consisting of coker gasoline, coker diesel, coker wax oil, and low sulfur petroleum coke; and an outlet in fluid communication with the separation unit, for discharging the first heavy component obtained from the separation unit as a low sulfur ship fuel oil fraction from the system.

Preferably, the delayed coking unit is in fluid communication with the first reaction unit, for recycling the coker wax oil and/or the coker wax oil obtained in the delayed coking unit back to the first reaction unit.

Preferably, the system further comprises a solvent deasphalting unit, and the system further comprises a solvent deasphalting unit in fluid communication with the first reaction unit, which is used for introducing the deoiled asphalt obtained after the solvent deasphalting treatment of the heavy oil feedstock therein into the first reaction unit.

According to a preferred embodiment, in the system of the invention, the second reaction unit is a hydrocracking unit.

According to another preferred embodiment, in the system of the present invention, the second reaction unit is a catalytic cracking unit and the catalytic cracking unit is a fluidized catalytic cracking unit.

According to another preferred embodiment, in the system of the present invention, the second reaction unit is a diesel hydro-upgrading unit.

The invention further provides a second variant of the second aspect as follows:

In this second variant, the system comprises:

a first reaction unit, which is a moving bed-fixed bed hydrogenation combined unit or a moving bed hydrogenation unit, for carrying out hydrogenation reaction of the deoiled asphalt and the aromatics-containing stream;

a separation unit in fluid communication with the first reaction unit, for fractionating therein of the liquid phase product from the first reaction unit;

a second reaction unit in fluid communication with the separation unit, for reaction therein of the first light component obtained in the separation unit, wherein the second reaction unit is at least one selected from the group consisting of a hydrocracking unit, a catalytic cracking unit, and a diesel hydro-upgrading unit;

a delayed coking unit in fluid communication with the separation unit, for reaction therein of the first heavy component obtained from the separation unit, to provide at least one product selected from the group consisting of coker gasoline, coker diesel, coker wax oil, and low sulfur petroleum coke; and an outlet in fluid communication with the separation unit, for discharging the first heavy component obtained from the separation unit as a low sulfur ship fuel oil fraction from the system.

Preferably, the delayed coking unit is in fluid communication with the first reaction unit for recycling the coker wax oil and/or the coker wax oil obtained in the delayed coking unit back to the first reaction unit.

Preferably, the system further comprises a solvent deasphalting unit, which is in fluid communication with the first reaction unit and is used for introducing the deoiled asphalt obtained after the solvent deasphalting treatment of the heavy oil feedstock therein into the first reaction unit.

According to a preferred embodiment, in the system of the invention, the second reaction unit is a hydrocracking unit.

According to another preferred embodiment, in the system of the present invention, the second reaction unit is a catalytic cracking unit and the catalytic cracking unit is a fluidized catalytic cracking unit.

According to another preferred embodiment, in the system of the present invention, the second reaction unit is a diesel hydro-upgrading unit.

The invention further provides a third variant of the second aspect, which is described below.

In the third variant, the solvent deasphalting unit is used for subjecting the heavy raw oil to solvent deasphalting treatment therein, to provide deoiled asphalt and deasphalted oil;
- a third hydrogenation unit in fluid communication with the solvent deasphalting unit, wherein the third hydrogenation unit is a fixed bed hydrogenation unit for subjecting deasphalted oil from the solvent deasphalting unit to a hydrogenation reaction therein;
- a DCC unit in fluid communication with the third hydrogenation unit, for reaction therein a liquid phase effluent obtained in the third hydrogenation unit, to provide propylene, LCO, HCO and slurry oil;
- a fourth hydrogenation unit in fluid communication with the DCC unit, for subjecting the slurry oil obtained in the DCC unit to a demetallization reaction therein, to provide a demetallized slurry;
- a first hydrogenation unit which is either a fixed bed hydrogenation unit or a moving bed hydrogenation unit, wherein the first hydrogenation unit is in fluid communication with the DCC unit, the fourth hydrogenation unit, and the solvent deasphalting unit, for a conversion reaction therein of the demetalized slurry oil from the fourth hydrogenation unit and/or the slurry oil from the DCC unit with the deoiled asphalt from the solvent deasphalting unit;
- a separation unit in fluid communication respectively with the first hydrogenation unit and the DCC unit, for fractionating therein a liquid phase effluent from the first hydrogenation unit, which is capable of recycling the first light component obtained in the separation unit back to the DCC unit;
- a second reaction unit in fluid communication with the separation unit, for reaction therein of the first light component obtained in the separation unit, wherein the second reaction unit being is at least one selected from the group consisting of a hydrocracking unit, a catalytic cracking unit, and a diesel hydro-upgrading unit;
- a delayed coking unit in fluid communication with the separation unit, for reaction therein of the first heavy component obtained from the separation unit, to provide at least one product selected from the group consisting of coker gasoline, coker diesel, coker wax oil, and low sulfur petroleum coke; and
- an outlet in fluid communication with the separation unit, for discharging the first heavy component obtained from the separation unit as a low sulfur ship fuel oil fraction from the system.

Preferably, the delayed coking unit is in fluid communication with the first hydrogenation unit for recycling the coker diesel and/or the coker wax oil obtained in the delayed coking unit back to the first hydrogenation unit.

The invention further provides a fourth variant of the technical solution of the second aspect, which is described below.

In this fourth variant, the system comprises:
- a solvent deasphalting unit, used for solvent deasphalting treatment on the heavy raw oil in the solvent deasphalting unit, to provide deoiled asphalt and deasphalted oil;
- a third hydrogenation unit in fluid communication with the solvent deasphalting unit, wherein the third hydrogenation unit is a fixed bed hydrogenation unit, for a hydrogenation reaction therein of the deasphalted oil from the solvent deasphalting unit;
- a DCC unit in fluid communication with the third hydrogenation unit, for reaction therein a liquid phase effluent obtained in the third hydrogenation unit, to provide propylene, LCO, HCO and slurry oil;
- a first hydrogenation unit which is either a fixed bed hydrogenation unit or a moving bed hydrogenation unit, wherein the first hydrogenation unit is in fluid communication with the DCC unit and the solvent deasphalting unit, for a conversion reaction therein of the LCO and/or HCO from the DCC unit with the deasphalted pitch from the solvent deasphalting unit;
- a separation unit in fluid communication respectively with the first hydrogenation unit and the DCC unit, for fractionating therein a liquid phase effluent from the first hydrogenation unit, which is capable of recycling the first light component obtained in the separation unit back to the DCC unit;
- a second reaction unit in fluid communication with the separation unit, for reaction therein of the first light component obtained in the separation unit to provide at least one product selected from the group consisting of a gasoline fraction, a diesel fraction, and a BTX feedstock component;
- a delayed coking unit in fluid communication with the separation unit, for reaction therein of the first heavy component obtained from the separation unit, to provide at least one product selected from the group consisting of coker gasoline, coker diesel, coker wax oil, and low sulfur petroleum coke; and
- an outlet in fluid communication with the separation unit, for discharging the first heavy component obtained from the separation unit as a low sulfur ship fuel oil fraction from the system.

Preferably, the DCC unit is in fluid communication with the solvent deasphalting unit, for recycling the slurry obtained from the DCC unit back to the solvent deasphalting unit for solvent deasphalting.

The invention further provides a fifth variant of the technical solution of the second aspect, which is described below.

In this fifth variant, the system comprises:
- a fifth reaction unit, for hydrosaturation and fractionation on the aromatics-rich fraction oil to provide a second light component and a second heavy component;
- a first reaction unit, which is a fixed bed hydrogenation unit in fluid communication with the fifth reaction unit, for a hydrogenation reaction therein of the deoiled asphalt and the aromatics-containing stream comprising the second heavy component from the fifth reaction unit;
- a separation unit in fluid communication with the first reaction unit, for fractionating therein a liquid phase product from the first reaction unit;
- a second reaction unit in fluid communication with the separation unit, for reaction therein of the first light component obtained in the separation unit, wherein the second reaction unit being is at least one selected from the group consisting of a hydrocracking unit, a catalytic cracking unit, and a diesel hydro-upgrading unit;
- a delayed coking unit in fluid communication with the separation unit, for reaction therein of the first heavy component obtained from the separation unit, to provide at least one product selected from the group consisting of coker gasoline, coker diesel, coker wax oil, and low sulfur petroleum coke; and an outlet in fluid communication with the separation unit, for discharging the first heavy component obtained from the separation unit as a low sulfur ship fuel oil fraction from the system.

Preferably, the delayed coking unit is in fluid communication with the first reaction unit, for recycling the coker diesel and/or the coker wax oil obtained in the delayed coking unit back to the first reaction unit as at least part of the aromatics-containing stream.

Preferably, the system further comprises a solvent deasphalting unit, which is in fluid communication with the first reaction unit and is used for solvent deasphalting the heavy oil feedstock therein, and introducing the deoiled asphalt obtained after the solvent deasphalting into the first reaction unit.

According to a preferred embodiment, in the system of the invention, the second reaction unit is a hydrocracking unit.

According to another preferred embodiment, in the system of the present invention, the second reaction unit is a catalytic cracking unit and the catalytic cracking unit is a fluidized catalytic cracking unit.

According to another preferred embodiment, in the system of the present invention, the second reaction unit is a diesel hydro-upgrading unit.

The invention further provides a sixth variant of the technical solution of the second aspect, which is described below.

In this sixth variant, the system comprises:
a solvent deasphalting unit, used for solvent deasphalting treatment on the heavy raw oil in the solvent deasphalting unit, to provide deoiled asphalt and deasphalted oil;
a sixth hydrogenation unit in fluid communication with the solvent deasphalting unit, wherein the sixth hydrogenation unit is a fixed bed hydrogenation unit, for a hydrogenation reaction therein of the deasphalted oil from the solvent deasphalting unit;
a DCC unit in fluid communication with the sixth hydrogenation unit, for reaction therein a liquid phase effluent obtained in the sixth hydrogenation unit, to provide propylene, LCO, HCO and slurry oil;
a fifth hydrogen unit in fluid communication with the DCC unit, for hydrosaturating and fractionating therein an aromatics-rich fraction oil comprising the LCO and/or the HCO, to provide a second light component and a second heavy component;
a first reaction unit, which is a fixed bed hydrogenation unit in fluid communication respectively with the fifth hydrogenation unit and with the solvent deasphalting unit, for a hydrogenation reaction therein of the deasphalted pitch from the solvent deasphalting unit and an aromatics-containing stream comprising the second heavy component from the fifth hydrogenation unit;
a separation unit in fluid communication respectively with the first reaction unit and with the DCC unit, for fractionating therein a liquid phase product from the first reaction unit, which is capable of recycling the first light component obtained in the separation unit back to the DCC unit;
a second reaction unit in fluid communication with the separation unit, for reaction therein of the first light component obtained in the separation unit, wherein the second reaction unit being is at least one selected from the group consisting of a hydrocracking unit, a catalytic cracking unit, and a diesel hydro-upgrading unit;
a delayed coking unit in fluid communication with the separation unit, for reaction therein of the first heavy component obtained from the separation unit, to provide at least one product selected from the group consisting of coker gasoline, coker diesel, coker wax oil, and low sulfur petroleum coke; and
an outlet in fluid communication with the separation unit, for discharging the first heavy component obtained from the separation unit as a low sulfur ship fuel oil fraction from the system.

Preferably, the delayed coking unit is in fluid communication with the first reaction unit, for recycling the coker diesel and/or the coker wax oil obtained in the delayed coking unit back to the fifth hydrogenation unit.

According to a preferred embodiment, in the system of the invention, the second reaction unit is a hydrocracking unit.

According to another preferred embodiment, in the system of the present invention, the second reaction unit is a catalytic cracking unit and the catalytic cracking unit is a fluidized catalytic cracking unit.

According to another preferred embodiment, in the system of the present invention, the second reaction unit is a diesel hydro-upgrading unit.

Using the preferred embodiments of the invention, compared with the prior art, the invention adopts an effective combination of the processes of solvent deasphalting, heavy oil hydrogenation, hydrocracking or catalytic cracking or coking and the like, so that not only the light petroleum fraction is utilized with high efficiency, but also the DOA with low value is converted into a low-sulfur ship fuel component and a low-sulfur petroleum coke feedstock which meet the environmental protection requirement, thereby realizing the high-efficiency, environmental protection and comprehensive utilization of the heavy petroleum resource.

The present invention will be described in detail below by Examples. The following Examples were carried out using the process flow shown in FIG. 1, unless otherwise specified.

The results of Table 2 in the following Examples were, unless specifically indicated, the averages of the results obtained from the sampling test every 25 h in a continuous operation of the apparatus for 100 h.

The catalytic cracking catalysts MLC-500, RS-2100 hydrofining catalyst, RHC-131 hydrocracking catalyst, RG-30B, RDM-33B and RCS-31 were all catalysts produced by SINOPEC CATALYST CO., LTD. CHANGLING DIVISION.

The properties of the aromatics-rich fraction oil used in each Example were shown in Table 6.

The normal temperature involved below means 25±3° C.

Example I-A

Preparation of the mineral-rich precursor material 1: 2000 g of RPB110 pseudoboehmite produced by SINOPEC CATALYST CO., LTD. CHANGLING DIVISION was used, in which 1000 g was treated at 550° C. for 2 h to provide about 700 g of alumina, about 700 g of alumina and another 1000 g of pseudoboehmite were fully mixed, Then 40 g of sesbania powder and 20 g of citric acid were added, 2200 g of deionized water was added, and the mixture was kneaded and extruded into strips for molding, dried at 300° C. for 3 h to provide about 1730 g of support, into which 2100 mL of a solution containing Mo and Ni was added to for saturation impregnation, wherein the Mo content in the solution was 5.5 wt % calculated as $MoO_3$, the Ni content was 1.5 wt % calculated as NiO, and after impregnation for half an hour, treated at 180° C. for 4 h, to provide the mineral-rich precursor material 1, the properties of which were shown in Table I-5.

Preparation of the mineral-rich precursor material 2: 2000 g of RPB110 pseudoboehmite produced by SINOPEC CATALYST CO., LTD. CHANGLING DIVISION was used, 30 g of sesbania powder and 30 g of citric acid were added, 2400 g of deionized water was added, and the mixture was kneaded and extruded into strips for molding, dried at 120° C. for 5 h to provide about 2040 g of support, into which 2200 mL of a solution containing Mo and Ni was added to for saturation impregnation, wherein the Mo content in the solution was 7.5 wt % calculated as $MoO_3$, the Ni content was 1.7 wt % calculated as NiO, and after impregnation for half an hour, treated at 200° C. for 3 h, to provide the mineral-rich precursor material 2, the properties of which were shown in Table I-5.

Preparation of the mineral-rich precursor material 3: 2000 g of commercially available silica was used, 30 g of sesbania powder and 30 g of sodium hydroxide were added, 2400 g of deionized water was added, and the mixture was kneaded and extruded into strips for molding, dried at 120° C. for 5 h to provide support, into which 2200 mL of a solution containing Mo and Ni was added to for saturation impregnation, wherein the Mo content in the solution was 4.5 wt % calculated as $MoO_3$, the Ni content was 1.0 wt % calculated as NiO, and after impregnation for half an hour, treated at 200° C. for 3 h, to provide the mineral-rich precursor material 3, the properties of which were shown in Table I-5.

Example I-B

A solvent deasphalting was carried out by using vacuum residue of middle east as feedstock, the solvent was a hydrocarbon mixture mainly comprising butane (a butane content of 75 wt %) and comprising a small amount of propane and pentane, wherein the solvent deasphalting was carried out at 120° C., with the solvent:vacuum residue=1.5:1 (weight ratio), resulting in deasphalted oil (DAO) at a yield of 68.1 wt %, and deoiled asphalt (DOA) at a yield of 31.9 wt %.

Example I-1

Feedstock: the DOA in Example I-B was mixed with LCO at a weight ratio of 1:10, where the mixed feedstock was liquid at room temperature, and the properties of the mixed feedstock were shown in Table I-1.

A first reaction unit: the mixed feedstock was tested on a medium scaled fixed bed heavy oil hydrotreating device. According to the flowing direction of reactants, an RG-30B protective catalyst, a mineral-rich precursor material 1, a mineral-rich precursor material 2, an RDM-33B residual oil demetallization and desulfurization transition catalyst, and an RCS-31 desulfurization catalyst were sequentially loaded in the reactor of the first reaction unit, with loading ratios in volume as follows: RG-30B:mineral-rich precursor material 1: mineral-rich precursor material 2: RDM-33B:RCS-31=6:30:30:14:20. The fixed bed heavy oil hydrotreating was operated under conditions of: a temperature of 380° C., a reaction pressure of 16 MPa, a liquid hourly volume space velocity of 0.18 $h^{-1}$, a hydrogen/oil ratio (by volume) of 1000:1. After fixed bed hydrotreating on the mixed feed feedstock, properties of the product were shown in Table 1-2.

Separation: the liquid phase product obtained from the fixed bed heavy oil hydrotreatment was fractionated, and the properties of the first heavy component at a temperature of more than or equal to 335° C. were shown in Table I-3.

A second reaction unit: a hydrocracking test was carried out for the first light component at a temperature of less than 335° C. on a fixed bed hydrocracking device, with loading ratios of the catalysts as follows: RS-2100:RHC-131=40:60 (V/V). The hydrocracking process was operated under conditions of: a temperature of a refining section of 370° C., a temperature of a cracking section of 385° C., a reaction pressure of 7 MPa, a liquid hourly volume space velocity of 2.0 $h^{-1}$, and a hydrogen/oil ratio by volume of 1200:1. The properties of the obtained hydrocracked gasoline product were shown in Table I-4.

Example I-2

Feedstock: the DOA in Example I-B was mixed with HCO at a weight ratio of 5:10, where the mixed feedstock was liquid at room temperature, and the properties of the mixed feedstock were shown in Table I-1.

The loading of catalyst and processing conditions were same as those of the fixed bed heavy oil hydrotreatment in Example I-1, and after hydrotreatment, the product properties were shown in Table I-2.

Separation: the liquid phase product obtained from the fixed bed residual oil hydrotreatment was fractionated, and the properties of the first heavy component at a temperature of more than or equal to 378° C. were shown in Table I-3.

A second reaction unit: a test was carried out for the first light component at a temperature of less than 378° C. on a fixed bed hydrocracking device. The catalyst and the test conditions were same as those for the hydrocracking test of the first light component at a temperature of less than 335° C. in Example I-1, and a hydrocracking product was obtained, the properties of which were shown in Table I-4.

Example I-3

Feedstock: the DOA in Example I-B was mixed with LCO at a weight ratio of 10:10, where the mixed feedstock was liquid at room temperature, and the properties of the mixed feedstock were shown in Table I-1.

A first reaction unit: the mixed feedstock was tested on a medium scaled fixed bed heavy oil hydrotreating device. The loading of catalyst and processing conditions were same as those of the fixed bed heavy oil hydrotreatment in Example I-1, and after hydrotreatment, the product properties were shown in Table I-2.

Separation: the liquid phase product obtained from the fixed bed heavy oil hydrotreatment was fractionated, and the properties of the first heavy component at a temperature of more than or equal to 350° C. were shown in Table I-3.

A second reaction unit: a test was carried out for the first light component at a temperature of less than 350° C. on a fixed bed hydrocracking device. The catalyst and the test conditions were same as those for the hydrocracking test of the first light component at a temperature of less than 335° C. in Example I-1, and a hydrocracking product was obtained, the properties of which were shown in Table I-4.

Example I-4

Feedstock: the DOA in Example I-B was mixed with coal tar at a weight ratio of 15:10, where the mixed feedstock was liquid at room temperature, and the properties of the mixed feedstock were shown in Table I-1.

A first reaction unit: the mixed feedstock was tested on a medium scaled fixed bed heavy oil hydrotreating device. The loading of catalyst and processing conditions were same as those of the fixed bed heavy oil hydrotreatment in Example I-1, and after hydrotreatment, the product properties were shown in Table I-2.

Separation: the liquid phase product obtained from the fixed bed heavy oil hydrotreatment was fractionated, and the properties of the first heavy component at a temperature of more than or equal to 355° C. were shown in Table I-3.

A second reaction unit: a test was carried out for the first light component at a temperature of less than 355° C. on a fixed bed hydrocracking device. The catalyst and the test conditions were same as those for the hydrocracking test of the first light component at a temperature of less than 335° C. in Example I-1, and a hydrocracking product was obtained, the properties of which were shown in Table I-4.

Example I-5

A process similar to Example I-3 was used, except that:
A first reaction unit: in this Example, the temperature of the fixed bed heavy oil hydrotreating was 395° C. According to the flowing direction of reactants, the RG-30B protective catalyst, the mineral-rich precursor material 1, and the RCS-31 desulfurization catalyst were loaded in the reactor of the first reaction unit, with loading ratios in volume as follows: RG-30B: mineral-rich precursor material 1: RCS-31=7:65:28.

The other conditions were the same as in Example I-3.

The main physicochemical properties of the obtained first heavy component at a temperature of more than 350° C. were shown in Table I-3.

Example I-6

The DOA in Example I-B was mixed with LCO at a weight ratio of 10:10, where the mixed feedstock was liquid at room temperature, and the properties of the mixed feedstock were shown in Table I-1.

Loading of the catalyst and conditions of the fixed bed heavy oil hydrotreating were same as in Example I-3.

Every 30 days, the reaction temperature of the fixed bed was increased by 3° C., and the operation was stopped after 300 days of operation of the hydrogenation test. The oil generated by hydrogenation had a weight fraction of sulfur of between 0.46 and 0.50%, and a content of vanadium of between 10 and 15 μg/g.

The mineral-rich precursor material 1 and the mineral-rich precursor material 2 initially loaded into the reactor became, after reaction, a V-rich material 1 and a V-rich material 2, having a V content of respectively 55 wt % and 45 wt % after roasting analysis, which were thus high-quality materials for preparing V2O5 with high value.

Example I-7

The first heavy component at a temperature of more than or equal to 350° C. from Example I-3 was fed into a delayed coking unit for coking treatment, which delayed coking unit is operated under conditions of: a reaction temperature of 490° C. and a retention time of 1.5 h.

The low-sulfur petroleum coke was obtained at a yield of 28.7 wt %, and the weight fraction of sulfur in the petroleum coke was 2.7%.

Example I-8

A catalytic cracking test was carried out on the first light component at a temperature of less than 350° C. from Example I-3 in a small scaled catalytic cracking fixed fluidized bed test device, wherein the catalyst was a catalytic cracking catalyst MLC-500; and the fluidized catalytic unit was operated under conditions of: a reaction temperature of 540° C., a catalyst-to-oil ratio of 6, and a retention time of 3 s.

As a result, a product gasoline was obtained at a yield of 55.2 wt %, and the gasoline had a RON octane number of 95.8.

Example I-9

Feedstock: the mixed feedstock was same as in Example I-3

A first reaction unit: similar to example I-3, except that the loading of catalysts was different. In this Example, according to the flowing direction of reactants, RG-30B: the mineral-rich precursor material 1: mineral-rich precursor material 2=5:60:35 (V/V) were sequentially loaded. Conditions of the fixed bed heavy oil hydrotreating were same as in Example I-3.

Every 30 days, the reaction temperature of the fixed bed was increased by 3° C., and the operation was stopped after 330 days of operation of the hydrogenation test. The oil generated by hydrogenation had a weight fraction of sulfur of 0.55-0.65%, and a content of vanadium of 4-7 μg/g.

The mineral-rich precursor material 1 and the mineral-rich precursor material 2 initially loaded into the reactor became, after reaction, a V-rich material 1 and a V-rich material 2, having a V content of respectively 58 wt % and 47 wt % after roasting analysis, which were thus high-quality materials for preparing V2O5 with high value.

Example I-10

Feedstock: the mixed feedstock was same as in Example I-3.

A first reaction unit: similar to example I-3, except that the loading of catalysts was different. In this Example, according to the flowing direction of reactants, RG-30B: the mineral-rich precursor material 1:=10:90 (V/V) were sequentially loaded. Conditions of the fixed bed heavy oil hydrotreating were same as in Example I-3.

Every 30 days, the reaction temperature of the fixed bed was increased by 3° C., and the operation was stopped after 300 days of operation of the hydrogenation test. The oil generated by hydrogenation had a weight fraction of sulfur of 0.56-0.68%, and a content of vanadium of 2-4 μg/g.

The mineral-rich precursor material 1 initially loaded into the reactor became a V-rich material 1, having a V content of 61 wt % after roasting analysis, which was thus high-quality materials for preparing V2O5 with high value.

Example I-11

Feedstock: the DOA in Example I-B was mixed with LCO and coal tar II (obtained from Example I-7) at a weight ratio of 15:5:5, where the mixed feedstock was liquid at room temperature, and the properties of the mixed feedstock were shown in Table I-1.

A first reaction unit: the mixed feedstock was tested on a medium scaled fixed bed heavy oil hydrotreating device. The loading of catalyst and processing conditions were same as those of the fixed bed heavy oil hydrotreatment in Example I-1, and after hydrotreatment, the product properties were shown in Table I-2.

Separation: the liquid phase product obtained from the fixed bed heavy oil hydrotreatment was fractionated, and the properties of the first heavy component at a temperature of more than or equal to 355° C. were shown in Table I-3.

A second reaction unit: a test was carried out for the first light component at a temperature of less than 355° C. on a fixed bed hydrocracking device. The catalyst and the test conditions were same as those for the hydrocracking test of the first light component at a temperature of less than 335° C. in Example I-1, and a hydrocracking product was obtained, the properties of which were shown in Table I-4.

Example I-12

Feedstock: the DOA in example I-B was mixed with QY1 at a weight ratio of 1:10, where the mixed feedstock was liquid at room temperature, and the properties of the mixed feedstock were shown in Table I-1.

A first reaction unit: the mixed feedstock was tested on a medium scaled fixed bed heavy oil hydrotreating device. The loading of catalyst and processing conditions were same as those of the fixed bed heavy oil hydrotreatment in Example I-1, and after hydrotreatment, the product properties were shown in Table I-2.

Separation: the liquid phase product obtained from the fixed bed heavy oil hydrotreatment was fractionated, and the properties of the first heavy component at a temperature of more than or equal to 350° C. were shown in Table I-3.

A second reaction unit: a test was carried out for the first light component at a temperature of less than 350° C. on a fixed bed hydrocracking device. The catalyst and the test conditions were same as those for the hydrocracking test of the first light component at a temperature of less than 335° C. in Example I-1, and a hydrocracking product was obtained, the properties of which were shown in Table I-4.

Example I-13

Feedstock: the DOA in example I-B was mixed with QY2 at a weight ratio of 2:10, where the mixed feedstock was liquid at room temperature, and the properties of the mixed feedstock were shown in Table I-1.

A first reaction unit: the mixed feedstock was tested on a medium scaled fixed bed heavy oil hydrotreating device. The loading of catalyst and processing conditions were same as those of the fixed bed heavy oil hydrotreatment in Example I-1, and after hydrotreatment, the product properties were shown in Table I-2.

Separation: the liquid phase product obtained from the fixed bed heavy oil hydrotreatment was fractionated, and the properties of the first heavy component at a temperature of more than or equal to 335° C. were shown in Table I-3.

A second reaction unit: a test was carried out for the first light component at a temperature of less than 335° C. on a fixed bed hydrocracking device. The catalyst and the test conditions were same as those for the hydrocracking test of the first light component at a temperature of less than 335° C. in Example I-1, and a hydrocracking product was obtained, the properties of which were shown in Table I-4.

Example I-14

Feedstock: the mixed feedstock was same as in Example I-1.

A first reaction unit: similar to example I-1, except that the loading of catalysts was different. In this Example, according to the flowing direction of reactants, an RG-30B protective catalyst, a mineral-rich precursor material 1, an RDM-33B residual oil demetallization and desulfurization transition catalyst, and an RCS-31 desulfurization catalyst were sequentially loaded in the reactor of the first reaction unit, with loading ratios in volume as follows: RG-30B: mineral-rich precursor material 1: RDM-33B:RCS-31=6:60: 14:20.

The other conditions were the same as in Example I-1.

After fixed bed hydrotreating on the mixed feed feedstock, properties of the product were shown in Table I-2.

The liquid phase product obtained from the fixed bed heavy oil hydrotreatment was fractionated, and the properties of the first heavy component at a temperature of more than or equal to 335° C. were shown in Table I-3.

Example I-15

Feedstocks: the mixed feedstocks were the same as in Example I-1.

A first reaction unit: similar to example I-1, except that the loading of catalysts was different. In this Example, according to the flowing direction of reactants, the reactor of the first reaction unit was loaded with firstly a mineral-rich precursor material 2, followed by a: mineral-rich precursor material 1, that is According to the flowing direction of reactants, an RG-30B protective catalyst, a mineral-rich precursor material 2, a mineral-rich precursor material 1, an RDM-33B residual oil demetallization and desulfurization transition catalyst, and an RCS-31 desulfurization catalyst were loaded in the reactor of the first reaction unit, with loading ratios in volume as follows: RG-30B: mineral-rich precursor material 2: mineral-rich precursor material 1: RDM-33B:RCS-31=6: 30:30: 14:20.

The other conditions were the same as in Example I-1.

After fixed bed hydrotreating on the mixed feed feedstock, properties of the product were shown in Table I-2.

The liquid phase product obtained from the fixed bed heavy oil hydrotreatment was fractionated, and the properties of the first heavy component at a temperature of more than or equal to 335° C. were shown in Table I-3.

Example I-16

Feedstocks: the mixed feedstocks were the same as in Example I-1.

A first reaction unit: similar to example I-1, except that the loading of catalysts was different. In this Example, according to the flowing direction of reactants, an RG-30B protective catalyst, an RDM-33B residual oil demetallization and desulfurization transition catalyst, and an RCS-31 desulfurization catalyst were sequentially loaded in the reactor of the first reaction unit, with loading ratios in volume as follows: RG-30B: RDM-33B:RCS-31=10:40:50.

The other conditions were the same as in Example I-1.

After fixed bed hydrotreating on the mixed feed feedstock, properties of the product were shown in Table I-2.

The liquid phase product obtained from the fixed bed heavy oil hydrotreatment was fractionated, and the properties of the first heavy component at a temperature of more than or equal to 335° C. were shown in Table I-3.

Example I-17

Feedstocks: the mixed feedstocks were the same as in Example I-1.

A first reaction unit: similar to example I-1, except that the loading of catalysts was different. In this Example, according to the flowing direction of reactants, an RG-30B protective catalyst, a mineral-rich precursor material 3, a mineral-rich precursor material 2, an RDM-33B residual oil demetallization and desulfurization transition catalyst, and an RCS-31 desulfurization catalyst were sequentially loaded in the reactor of the first reaction unit, with loading ratios in volume as follows: RG-30B:mineral-rich precursor material 3: mineral-rich precursor material 2: RDM-33B:RCS-31=6: 30:30:14:20.

The other conditions were the same as in Example I-1.

After fixed bed hydrotreating on the mixed feed feedstock, properties of the product were shown in Table I-2.

The liquid phase product obtained from the fixed bed heavy oil hydrotreatment was fractionated, and the properties of the first heavy component at a temperature of more than or equal to 335° C. were shown in Table I-3.

Comparative Example I-1

Feedstock: the DOA in example I.B was mixed with QY3 at a weight ratio of 3:10, where the DOA could not be completely dissolved at 100° C., i.e. the obtained mixture was non-liquid, and the properties of the mixed feedstock were shown in Table I-1

As the mixed feedstock comprised a large amount of solids, the next experiment could not be carried out.

TABLE I-1

Properties of the mixed feedstock

| Item | Species | ratio, wt | $C_7$ insoluble substances, wt % | Carbon residue, wt % | Sulfur, wt % | Viscosity (100° C.) (mm$^2$/s) | Ni + V, (μg/g) |
|---|---|---|---|---|---|---|---|
| Ex. I-1 | DOA:LCO | 1:10 | 3 | 4.46 | 1.51 | 1.7 | 33.2 |
| Ex. I-2 | DOA:HCO | 5:10 | 10.1 | 9.2 | 2.41 | 3.35 | 108.1 |
| Ex. I-3 | DOA:LCO | 10:10 | 15.3 | 23.3 | 3.21 | 140.2 | 252.2 |
| Ex. I-4 | DOA:coal tar I | 15:10 | 18.4 | 27.3 | 3.55 | 286.4 | 302.6 |
| Ex. I-11 | DOA:LCO:coal tar II | 15:5:5 | 16.3 | 21.5 | 3.12 | 290.3 | 300.1 |
| Ex. I-12 | DOA:QY 1 | 1:10 | 2.9 | 4.53 | 1.42 | 2.8 | 36.2 |
| Ex. I-13 | DOA:QY 2 | 2:10 | 5.4 | 8.41 | 2.53 | 15.4 | 66.2 |
| C.Ex. I-1 | DOA:QY 3 | 3:10 | DOA could not be dissolved completely | | | | |

TABLE I-2

Properties of product after fixed bed heavy oil hydrotreating

| Item | $C_7$ insoluble substances, wt % | Carbon residue, wt % | Sulfur, wt % | Viscosity (100° C.), mm$^2$/s | Ni + V (μg/g) |
|---|---|---|---|---|---|
| Example I-1 | 0.5 | 3.2 | 0.20 | 3.1 | 5.1 |
| Example I-2 | 0.5 | 5.1 | 0.27 | 3.8 | 7.1 |
| Example I-3 | 1.5 | 9.4 | 0.35 | 6.08 | 14.6 |
| Example I-4 | 1.8 | 10.4 | 0.39 | 18.4 | 25.8 |
| Example I-5 | 0.3 | 8.1 | 0.32 | 5.3 | 12.4 |
| Example I-11 | 1.9 | 10.8 | 0.31 | 19.3 | 26.2 |
| Example I-12 | 0.9 | 2.2 | 0.19 | 3.6 | 7.1 |
| Example I-13 | 1.8 | 4.5 | 0.50 | 30.1 | 15.1 |
| Example I-14 | 0.6 | 3.3 | 0.26 | 5.1 | 7.3 |
| Example I-15 | 0.7 | 3.8 | 0.29 | 6.2 | 8.4 |
| Example I-16 | 1.0 | 4.5 | 0.4 | 3.3 | 6.8 |
| Example I-17 | 0.6 | 3.4 | 0.3 | 4.5 | 6.0 |

TABLE I-3

Properties of the first heavy component

| Item | Initial boiling point C. | Yield wt % | Density/ 20° C. g/cm$^3$ | $C_7$ insoluble substances wt % | Carbon residue wt % | Sulfur wt % | Viscosity (100° C.) mm$^2$/s | (Ni + V) μg/g |
|---|---|---|---|---|---|---|---|---|
| Ex. I-1 | 335 | 11.1 | 0.9323 | 3.5 | 7.2 | 0.42 | 80.1 | 15.1 |
| Ex. I-2 | 378 | 60.1 | 0.9528 | 5.5 | 8.1 | 0.63 | 93.2 | 17.1 |
| Ex. I-3 | 350 | 28.8 | 0.9732 | 6.5 | 23..2 | 1.31 | 105.3 | 30.6 |
| Ex. I-4 | 355 | 70.1 | 0.9801 | 7.8 | 26.4 | 1.40 | 118.4 | 45.1 |
| Ex. I-5 | 350 | 26.1 | 0.971 | 3.0 | 14.5 | 0.38 | 65.1 | 22.3 |
| Ex. I-11 | 353 | 60.1 | 0.9841 | 6.8 | 25.9 | 1.02 | 119.3 | 43.2 |
| Ex. I-12 | / | / | 0.9355 | 3.9 | 6.2 | 0.80 | 83.6 | 20.2 |
| Ex. I-13 | / | / | 0.9527 | 5.8 | 8.5 | 0.98 | 100.1 | 40.3 |

TABLE I-3-continued

Properties of the first heavy component

| Item | Initial boiling point C. | Yield wt % | Density/ 20° C. g/cm$^3$ | C$_7$ insoluble substances wt % | Carbon residue wt % | Sulfur wt % | Viscosity (100° C.) mm$^2$/s | (Ni + V) μg/g |
|---|---|---|---|---|---|---|---|---|
| Ex. I-14 | 335 | 12.0 | 0.9328 | 3.7 | 7.5 | 0.45 | 82.5 | 16.5 |
| Ex. I-15 | 335 | 12.5 | 0.9331 | 3.9 | 7.7 | 0.48 | 85.3 | 17.2 |
| Ex. I-16 | 337 | 13.1 | 0.9343 | 3.8 | 8.1 | 0.48 | 86.5 | 17.2 |
| Ex. I-17 | 336 | 13.8 | 0.9341 | 3.7 | 7.4 | 0.46 | 85.1 | 15.9 |

TABLE I-4 hydrocracking gasoline product properties

| Item | Yield, wt % | Density (20° C.)/ g/cm$^3$ | RON | Sulfur content, μg/g |
|---|---|---|---|---|
| Ex. I-1 | 84.12 | 0.7256 | 95 | 5.9 |
| Ex. I-2 | 82.04 | 0.7323 | 92 | 6.6 |
| Ex. I-3 | 79.11 | 0.7494 | 90 | 7.3 |
| Ex. I-4 | 75.36 | 0.7792 | 89 | 9.1 |
| Ex. I-11 | 74.21 | 0.7782 | 88 | 9.3 |
| Ex. I-12 | 81.30 | 0.7488 | 94 | 7.0 |
| Ex. I-13 | 78.33 | 0.7603 | 92 | 9.5 |
| Ex. I-14 | 84.01 | 0.7266 | 95 | 6.0 |
| Ex. I-15 | 83.98 | 0.7260 | 95 | 6.1 |
| Ex. I-16 | 84.05 | 0.7271 | 95 | 6.3 |
| Ex. I-17 | 83.84 | 0.7310 | 95 | 6.9 |

TABLE I-5

Properties of mineral-rich precursor material

| | Loss on ignition wt % | Specific surface area, m$^2$/g | Water absorption, g/g |
|---|---|---|---|
| Mineral-rich precursor material 1 | 13.5 | 263 | 1.08 |
| Mineral-rich precursor material 2 | 29.9 | 279 | 1.22 |
| Mineral-rich precursor material 3 | 20.5 | 99 | 1.05 |

TABLE I-6

Properties of aromatics-rich fraction oil

| | End point of distillation | Aromatic hydrocarbon content, wt % | Origin |
|---|---|---|---|
| LCO | 310° C. | 51 | — |
| HCO | 350° C. | 54 | — |
| Coal tar I | 345° C. | 55 | — |
| Coal tar II | 315° C. | 50 | Example I-7 |
| QY1 | 300° C. | 40 | Light oil product of oil refinery |
| QY2 | 298° C. | 30 | Light oil product of oil refinery |
| QY3 | 295° C. C. | 20 | Light oil product of oil refinery |

Example II-1

Feedstock: the DOA in the example I-B was mixed with LCO at a weight ratio of 1:10, where the mixed feedstock was liquid at room temperature, and the properties of the mixed feedstock were shown in Table II-1.

A first reaction unit: the mixed feedstock was tested on a medium scaled moving bed-fixed bed heavy oil hydrotreating device. The moving-bed reactor was loaded with a mineral-rich precursor material 1; and according to the flowing direction of reactants, the fixed bed reactor was loaded with a mineral-rich precursor material 2, an RDM-33B residual oil demetallization and desulfurization transition catalyst, and an RCS-31 desulfurization catalyst, with loading ratios in volume as follows: mineral-rich precursor material 1: mineral-rich precursor material 2: RDM-33B: RCS-31=30:36: 14:20. The hydrotreating was operated under conditions of: a pressure of 16 MPa, a hourly volume space velocity of 0.18 h$^{-1}$, and a hydrogen/oil ratio (by volume) of 1000:1, wherein the hydrogenation of the moving-bed reactor is reacted at a temperature of 385° C., and the hydrogenation of the fixed bed reactor is reacted at a temperature of 370° C. After fixed bed hydrotreating on the mixed feed feedstock, properties of the product were shown in Table II-2.

Separation: the liquid phase product obtained from the hydrotreatment was fractionated, and the properties of the first heavy component at a temperature of more than or equal to 335° C. were shown in Table II-3.

A second reaction unit: a hydrocracking test was carried out for the first light component at a temperature of less than 335° C. on a fixed bed hydrocracking device, with loading ratios of the catalysts as follows: RS-2100:RHC-131=40:60 (V/V). The hydrocracking process was operated under conditions of: a temperature of a refining section of 370° C., a temperature of a cracking section of 385° C., a reaction pressure of 7 MPa, a hourly volume space velocity of 2.0 h$^{-1}$, and a hydrogen/oil ratio by volume of 1200:1. The properties of the obtained hydrocracked gasoline product were shown in Table II-4.

Example II-2

Feedstock: the DOA in the example I.B was mixed with HCO at a weight ratio of 5:10, where the mixed feedstock was liquid at room temperature, and the properties of the mixed feedstock were shown in Table II-1.

A first reaction unit: the mixed feedstock was tested on a medium scaled moving bed-fixed bed heavy oil hydrotreating device. The loading of catalyst and processing conditions were same as those of the fixed bed heavy oil hydrotreatment in Example II-1, and after hydrotreatment, the product properties were shown in Table II-2.

Separation: the liquid phase product obtained from the hydrotreatment was fractionated, and the properties of the first heavy component at a temperature of more than or equal to 378° C. were shown in Table II-3.

A second reaction unit: a test was carried out for the first light component at a temperature of less than 378° C. on a fixed bed hydrocracking device. The catalyst and the test conditions were same as those for the hydrocracking test of the first light component at a temperature of less than 378° C. in Example II-1, and a hydrocracking product was obtained, the properties of which were shown in Table II-4.

TABLE II-1 mixed feedstock properties

| Item | Species | ratio, wt | $C_7$ insoluble substances, wt % | Carbon residue, wt % | Sulfur, wt % | Viscosity (100° C.) (mm$^2$/s) | Ni + V, (μg/g) |
|---|---|---|---|---|---|---|---|
| Example 1 | DOA LCO | 1:10 | 3 | 4.46 | 1.51 | 1.7 | 33.2 |
| Example 2 | DOA HCO | 5:10 | 10.1 | 9.2 | 2.41 | 3.35 | 108.1 |

TABLE II-2 product properties after heavy oil hydrotreating

| Item | $C_7$ insoluble substances, wt % | Carbon residue, wt % | Sulfur, wt % | Viscosity (100° C.), mm$^2$/s | Ni + V (μg/g) |
|---|---|---|---|---|---|
| Example 1 | 0.4 | 3.1 | 0.19 | 3.0 | 4.9 |
| Example 2 | 0.4 | 4.8 | 0.26 | 3.7 | 6.8 |

TABLE II-3 first heavy component property

| Item | Initial boiling point C. | Yield wt % | Density/ 20° C. g/cm$^3$ | $C_7$ insoluble substances wt % | Carbon residue wt % | Sulfur wt % | Viscosity (100° C.) mm$^2$/s | (Ni + V) μg/g |
|---|---|---|---|---|---|---|---|---|
| Example 1 | 335 | 10.9 | 0.9302 | 3.3 | 6.8 | 0.40 | 79.4 | 11.1 |
| Example 2 | 378 | 58.7 | 0.9499 | 5.2 | 7.9 | 0.61 | 92.7 | 13.5 |

TABLE II-4 hydrocracking gasoline product properties

| Item | Yield, wt % | Density (20° C.), g/cm$^3$ | RON | Sulfur content, μg/g |
|---|---|---|---|---|
| Example 1 | 80.22 | 0.7122 | 95.5 | 5.3 |
| Example 2 | 79.63 | 0.7233 | 92.8 | 6.1 |

Example III-A

A solvent deasphalting was carried out by using vacuum residue of middle east as feedstock, the solvent was a hydrocarbon mixture mainly comprising butane (a butane content of 75 wt %) and comprising a small amount of propane and pentane, wherein the solvent deasphalting was carried out at 120° C., with the solvent:vacuum residue=4:1 (weight ratio), resulting in deasphalted oil (DAO) at a yield of 72.4 wt %, and deoiled asphalt (DOA) at a yield of 27.2 wt %.

Example III-1

Both DAO and DOA used in the Example were from Example III-A, and the properties of DAO and DOA were given in Table III-1.

The properties of the liquid phase product obtained from DAO subjected to the third hydrogenation unit were shown in Table III-1.

The DCC unit was operated under conditions of: a reaction temperature of 410° C., a catalyst-to-oil ratio of 3, and a retention time of 5 s; and the DCC unit resulted in LCO1 (see Table III-6 for the properties), HCO1, and slurry oil 1.

The slurry oil 1 obtained by the DCC unit was subjected to a fourth hydrogenation unit (a fixed bed residual oil hydrogenation unit) to provide a demetallized slurry oil 1, and the properties thereof were shown in Table III-1.

DOA and the demetallized slurry oil 1 were mixed at a weight ratio of 1:10, and the mixed feedstock (see Table III-2 for properties thereof) was subjected to hydrotreating by a first hydrogenation unit (fixed bed residual oil hydrotreating unit). The properties of the product were shown in Table III-3.

The liquid phase product obtained from the first hydrogenation unit was fractionated, and the properties of the first heavy component at a temperature of more than or equal to 350° C. were shown in Table III-4.

A test was carried out for the first light component at a temperature of less than 350° C. on a fixed bed hydrocracking device. The properties of the obtained hydrocracked product were shown in Table III-5.

Example III-2

The DAO and DOA used in the Example were same as in Example III-1.

The properties of the liquid phase product obtained from DAO subjected to the third hydrogenation unit were same as those in Example III-1.

The DCC unit was operated under conditions of: a reaction temperature of 420° C., a catalyst-to-oil ratio of 3, and a retention time of 5 s; and the DCC unit resulted in LCO2, HCO2, and slurry oil 2.

The slurry oil 2 obtained by the DCC unit was subjected to a fourth hydrogenation unit (a fixed bed residual oil hydrogenation unit) to provide a demetallized slurry oil 2, and the properties thereof were shown in Table III-1.

DOA and the demetallized slurry oil 2 were mixed at a weight ratio of 5:10, and the mixed feedstock (see Table III-2 for properties thereof) was subjected to hydrotreating by a first hydrogenation unit (fixed bed residual oil hydrotreating unit). The properties of the product were shown in Table III-3.

The liquid phase product obtained from the first hydrogenation unit was fractionated, and the properties of the first heavy component at a temperature of more than or equal to 350° C. were shown in Table III-4.

A test was carried out for the first light component at a temperature of less than 350° C. on a fixed bed hydrocracking device. The properties of the obtained hydrocracked product were shown in Table III-5.

Example III-3

The DAO and DOA used in the Example were same as in Example III-1.

The properties of the liquid phase product obtained from DAO subjected to the third hydrogenation unit were same as those in Example III-1.

The DCC unit was operated under conditions of: a reaction temperature of 440° C., a catalyst-to-oil ratio of 3, and a retention time of 5 s; and the DCC unit resulted in LCO3, HCO3, and slurry oil 3.

The slurry oil 3 obtained by the DCC unit was subjected to a fourth hydrogenation unit (a fixed bed residual oil hydrogenation unit) to provide a demetallized slurry oil 3, and the properties thereof were shown in Table III-1.

DOA and the demetallized slurry oil 3 were mixed at a weight ratio of 10:10, and the mixed feedstock (see Table III-2 for properties thereof) was subjected to hydrotreating by a first hydrogenation unit (fixed bed residual oil hydrotreating unit). The properties of the product were shown in Table III-3.

The liquid phase product obtained from the first hydrogenation unit was fractionated, and the properties of the first heavy component at a temperature of more than or equal to 350° C. were shown in Table III-4.

A test was carried out for the first light component at a temperature of less than 350° C. on a fixed bed hydrocracking device. The properties of the obtained hydrocracked product were shown in Table III-5.

Example III-4

DOA (from Example III-A) and the demetallized slurry oil 1 were mixed at a weight ratio of 15:10, and the mixed feedstock (see Table III-2 for properties thereof) was subjected to hydrotreating by a first hydrogenation unit (moving bed residual oil hydrotreating unit). The properties of the product were shown in Table III-3.

The liquid phase product obtained from the first hydrogenation unit was fractionated, and the properties of the first heavy component at a temperature of more than or equal to 350° C. were shown in Table III-4.

A test was carried out for the first light component at a temperature of less than 350° C. on a fixed bed hydrocracking device. The properties of the obtained hydrocracked product were shown in Table III-5.

Example III-5

DOA (from Example III-A) was mixed with LCO1, HCO1, and the demetallized slurry oil 1 at a weight ratio of 1:3:3:4, and the mixed feedstock (see Table III-2 for properties thereof) was subjected to hydrotreating by a first hydrogenation unit (fixed bed residual oil hydrotreating unit). The properties of the product were shown in Table III-3.

The liquid phase product obtained from the first hydrogenation unit was fractionated, and the properties of the first heavy component at a temperature of more than or equal to 350° C. were shown in Table III-4.

A test was carried out for the first light component at a temperature of less than 350° C. on a fixed bed hydrocracking device. The properties of the obtained hydrocracked product were shown in Table III-5.

Example III-6

The first heavy component obtained in Example III-1 was fed into a delayed coking unit for reaction, to provide a coker gasoline.

The delayed coking unit was operated under conditions of: a reaction temperature of 490° C. and a retention time of 1.5 h.

As a result: the coker gasoline was obtained at a yield of 29.7 wt %, and the weight fraction of sulfur in the petroleum coke was 2.7%.

Example III-7

The procedures were similar to those of Example III-1, except that the first heavy component obtained was fed into a delayed coking unit for reaction, to provide a coker gasoline, a coker diesel and a coker wax oil.

The delayed coking unit was operated under conditions of: a reaction temperature of 500° C. and a retention time of 1.2 h.

As a result: the coker gasoline was obtained at a yield of 30.8 wt %, and the weight fraction of sulfur in the petroleum coke was 2.5%.

The coker diesel and coker wax oil were recycled to the first hydrogenation unit (fixed bed residue oil hydrogenation unit) for hydrotreatment, wherein the mixed feedstock (properties thereof were shown in Table III-2) was composed by DOA: demetallized slurry 1: coker diesel: coker wax oil at a weight ratio of 1:5:3: 2. After hydrotreatment, properties of the product were shown in Table III-3.

The first hydrogenation unit of the Example was operated under conditions same as those in Example III-1.

The liquid phase product obtained from the first hydrogenation unit was fractionated, and the properties of the first heavy component at a temperature of more than or equal to 350° C. were shown in Table III-4.

A test was carried out for the first light component at a temperature of less than 350° C. on a fixed bed hydrocracking device. The properties of the obtained hydrocracked product were shown in Table III-5.

Example III-8

A test was carried out for the first light component at a temperature of less than 350° C. obtained from Example III-1 on a fixed bed hydrocracking device. A diesel component was obtained.

The catalysts used were RS-2100 hydrofining catalyst and RHC-131 hydrocracking catalyst produced by SINOPEC CATALYST CO., LTD. CHANGLING DIVISION. The loading ratio between the catalysts was as follows: RS-2100: RHC-131=40:60 (V/V). The hydrocracking process was operated under conditions of: a temperature of a refining section of 370° C., a temperature of a cracking section of 385° C., a reaction pressure of 7 MPa, a liquid hourly volume space velocity of 2.0 h$^{-1}$, and a hydrogen/oil ratio by volume of 1200:1. The properties of the obtained hydrocracked gasoline product were shown in Table III-4.

Example III-9

A mixed feedstock same as that in example III-1 was hydrotreated in a first hydrogenation unit (moving bed residue hydrotreatment unit) to provide a product, the properties thereof as shown in Table III-3.

The liquid phase product obtained from the first hydrogenation unit was fractionated, and the properties of the first heavy component at a temperature of more than or equal to 350° C. were shown in Table III-4.

A test was carried out for the first light component at a temperature of less than 350° C. on a fixed bed hydrocracking device. The properties of the obtained hydrocracked product were shown in Table III-5.

Example III-10

DOA (from Example III-A) used in the example was mixed with refinery light oil QY1 and the demetallized slurry oil 1 at a weight ratio of 1:5:5, and the mixed feedstock (see Table III-2 for properties thereof) was subjected to hydrotreating by a first hydrogenation unit (fixed bed residual oil hydrotreating unit). The properties of the product were shown in Table III-3.

The liquid phase product obtained from the first hydrogenation unit was fractionated, and the properties of the first heavy component at a temperature of more than or equal to 350° C. were shown in Table III-4.

A test was carried out for the first light component at a temperature of less than 350° C. on a fixed bed hydrocracking device. The properties of the obtained hydrocracked product were shown in Table III-5.

Example III-11

DOA (from Example III-A) used in the example was mixed with refinery light oil QY2 and the demetallized slurry oil 1 at a weight ratio of 2:5:5, and the mixed feedstock (see Table III-2 for properties thereof) was subjected to hydrotreating by a first hydrogenation unit (fixed bed residual oil hydrotreating unit). The properties of the product were shown in Table III-3.

The liquid phase product obtained from the first hydrogenation unit was fractionated, and the properties of the first heavy component at a temperature of more than or equal to 350° C. were shown in Table III-4.

A test was carried out for the first light component at a temperature of less than 350° C. on a fixed bed hydrocracking device. The properties of the obtained hydrocracked product were shown in Table III-5.

Example III-12

DOA (from Example III-A) used in the example was mixed with filtered slurry oil 1 (with a solid content of 5 μg/g) at a weight ratio of 1:10, and the mixed feedstock (see Table III-2 for properties thereof) was subjected to hydrotreating by a first hydrogenation unit (fixed bed residual oil hydrotreating unit). The properties of the product were shown in Table III-3.

The liquid phase product obtained from the first hydrogenation unit was fractionated, and the properties of the first heavy component at a temperature of more than or equal to 350° C. were shown in Table III-4.

The properties of the obtained hydrocracked product were shown in Table III-5.

Example III-13

This example was carried out in a manner similar to example III-1, except that in this Example, the first light component at a temperature of less than 350° C. was recycled to the DCC unit at a recycle ratio of 0.1.

The DCC unit resulted in LCO13, HCO13, and slurry oil 13.

The slurry oil 13 obtained by the DCC unit was subjected to a fourth hydrogenation unit (a fixed bed residual oil hydrogenation unit) to provide a demetallized slurry oil 13, and the properties thereof were shown in Table III-1.

DOA and the demetallized slurry oil 13 were mixed at a weight ratio of 1:10, and the mixed feedstock (see Table III-2 for properties thereof) was subjected to hydrotreating by a first hydrogenation unit (fixed bed residual oil hydrotreating unit). The properties of the product were shown in Table III-3.

A test was carried out for the first light component at a temperature of less than 350° C. on a fixed bed hydrocracking device. The properties of the obtained hydrocracked product were shown in Table III-5.

Comparative Example III-1

The catalyst and device were same as in example III-1.

DOA was mixed with light oil QY3 and the demetallized slurry oil 1 at a weight ratio of 3:5:5, and DOA did not achieve complete dissolution at 100° C.

As the mixed feedstock comprised a large amount of solids, the next experiment could not be carried out.

TABLE III-1

Properties of DOA, DAO, and liquid-phase product after treatment by the third hydrogenation unit

| Item | DOA | DAO | Liquid phase product 1 | Demetallized slurry oil 1 | Demetallized slurry oil 2 | Demetallized slurry oil 3 | Demetallized slurry oil 4 | Demetallized slurry oil 13 |
|---|---|---|---|---|---|---|---|---|
| Density (20° C.), g/cm$^3$ | 1132.69 | 989.6 | 943.2 | 1020 | 1032 | 1043 | 1028 | 1002 |
| Carbon residue, wt % | 54.56 | 13.6 | 5.2 | 8.5 | 8.7 | 9.1 | 8.9 | 7.9 |
| Sulfur content, wtwt % | 6.13 | 3.815 | 0.24 | 0.21 | 0.20 | 0.21 | 0.21 | 0.20 |
| Nitrogen content, wt % | 0.772 | 0.235 | 0.15 | 0.11 | 0.11 | 0.11 | 0.11 | 0.10 |
| (Ni + V), μg/g | 378 | 32.78 | 5.41 | 4 | 5 | 6 | 4 | 4 |
| Aromatic hydrocarbon content, wt % | 63 | 45 | 40 | 65 | 63 | 62 | 65 | 65 |
| End point, ° C. | / | 348 | 342 | 351 | 350 | 346 | 352 | 358 |

Liquid phase product[1] denoted: the liquid phase product after treatment by the third hydrogenation unit.

TABLE III-2

Properties of the mixed feedstock

| Mixed feedstock | Example III-1 | Example III-2 | Example III-3 | Example III-4 | Examples III-5 |
|---|---|---|---|---|---|
| Species | DOA:Demetallized slurry oil 1 | DOA:Demetallized slurry oil 2 | DOA:Demetallized slurry oil 3 | DOA:demetallized slurry oil 4 | DOA:LCO 1:HCO 1:demetallized slurry oil |
| Ratio, wt | 1:10 | 5:10 | 10:10 | 15:10 | 1:3:3:4 |
| State at 20° C. | Liquid state | Liquid state | Liquid state | Liquid state | Liquid state |
| $C_7$ insoluble substances/wt % | 3 | 10.1 | 15.3 | 18.4 | 3.8 |
| Carbon residue, wt % | 4.46 | 9.2 | 23.3 | 27.3 | 4.56 |
| Sulfur, wt % | 1.51 | 2.41 | 3.21 | 3.85 | 1.72 |
| Viscosity (100° C.), (mm$^2$/s) | 1.7 | 3.35 | 140.2 | 286.4 | 3.3 |
| Ni + V (μg/g) | 33.2 | 108.1 | 252.2 | 302.6 | 40.1 |

| Mixed feedstock | Example III-7 | Example III-10 | Example III-11 | Example III-12 | Example III-13 |
|---|---|---|---|---|---|
| Species | DOA:demetallized slurry oil 1:Coker diesel:coker wax oil | DOA:QY 1 | DOA:QY 2 | DOA:filtered slurry oil 1 | DOA:demetallized slurry oil 13 |
| Ratio, wt | 1:5:3:2 | 1:10 | 2:10 | 1:10 | 1:10 |
| State at 20° C. | Liquid | Liquid | Liquid | Liquid | Liquid |
| $C_7$ insoluble substances/wt % | 5 | 2.9 | 5.4 | 6 | 5 |
| Carbon residue, wt % | 5.45 | 4.53 | 8.41 | 8.45 | 6.67 |
| Sulfur, wt % | 2.10 | 1.42 | 2.53 | 3.09 | 2.45 |
| Viscosity (100° C.)/(mm$^2$/s) | 3.5 | 2.8 | 15.4 | 3.9 | 4.3 |
| Ni + V/(μg/g) | 45.2 | 36.2 | 66.2 | 59.4 | 33.6 |

TABLE III-3

Properties of the product after residue hydrotreatment by the fixed bed/moving bed in the first hydrogenation unit

| Item | $C_7$ insoluble substances, wt % | Carbon residue, wt % | Sulfur, wt % | Viscosity (100° C.), mm$^2$/s | (Ni + V), μg/g |
|---|---|---|---|---|---|
| Ex. III-1 | 0.5 | 3.2 | 0.20 | 3.1 | 5.1 |
| Ex. III-2 | 0.5 | 5.1 | 0.27 | 3.8 | 7.1 |
| Ex. III-3 | 1.5 | 9.4 | 0.35 | 6.08 | 14.6 |
| Ex. III-4 | 1.6 | 8.9 | 0.33 | 16.4 | 22.1 |
| Ex. III-5 | 0.5 | 3.2 | 0.20 | 3.1 | 5.1 |
| Ex. III-9 | 0.2 | 3.1 | 0.21 | 1.1 | 3.8 |
| Ex. III-10 | 0.9 | 2.2 | 0.19 | 3.6 | 7.1 |
| Ex. III-11 | 1.8 | 4.5 | 0.50 | 30.1 | 15.1 |
| Ex. III-12 | 0.6 | 3.3 | 0.24 | 5.1 | 7.3 |
| Ex. III-13 | 0.65 | 3.19 | 0.23 | 4.6 | 6.0 |

TABLE III-4

Properties of the first heavy component

| Item | $C_7$ insoluble substances, wt % | Carbon residue, wt % | Sulfur, wt % | Viscosity (100° C.), mm$^2$/s | (Ni + V), μg/g |
|---|---|---|---|---|---|
| Ex. III-1 | 3.5 | 7.2 | 0.42 | 80.1 | 15.1 |
| Ex. III-2 | 5.5 | 8.1 | 0.63 | 93.2 | 17.1 |
| Ex. III-3 | 6.5 | 14.4 | 0.70 | 105.3 | 20.6 |
| Ex. III-4 | 5.5 | 18.9 | 0.45 | 104.2 | 39.1 |
| Ex. III-5 | 3.7 | 8.1 | 0.45 | 88.0 | 16.1 |
| Ex. III-9 | 4.5 | 7.4 | 0.85 | 90.1 | 25.3 |
| Ex. III-10 | 3.9 | 6.2 | 0.80 | 83.6 | 20.2 |
| Ex. III-11 | 5.8 | 8.5 | 0.98 | 100.1 | 40.3 |
| Ex. III-12 | 3.9 | 9.1 | 0.47 | 90.5 | 17.1 |
| Ex. III-13 | 3.3 | 6.2 | 0.41 | 78.2 | 14.2 |

TABLE III-5

Properties of the hydrocracking product

| Item | Density (20° C.), g/cm$^3$ | Sulfur, μg/g | RON |
|---|---|---|---|
| Example III-1 | 0.72 | <10 | >92 |
| Example III-2 | 0.72 | <10 | >92 |
| Example III-3 | 0.72 | <10 | >92 |
| Example III-4 | 0.72 | <10 | >92 |
| Example III-5 | 0.72 | <10 | >92 |
| Example III-9 | 0.72 | <10 | >92 |
| Example III-10 | 0.72 | <10 | >92 |
| Example III-11 | 0.71 | <10 | >92 |
| Example III-12 | 0.72 | <10 | >92 |
| Example III-13 | 0.71 | <10 | >92 |

TABLE III-6

| | End point of distillation, ° C. | Content of aromatics, wt % |
|---|---|---|
| LCO1 | 270 | 55 |
| HCO1 | 310 | 61 |
| LCO2 | 267 | 60 |
| LCO3 | 285 | 59 |
| QY1 | 300 | 40 |
| QY2 | 203 | 30 |
| QY3 | 210 | 20 |

It could be seen from the data in Table III-4 that the technology of the present invention was capable of producing high quality low sulfur ship fuel or low sulfur coke product feedstock from DOA.

It could be seen from the data in Table III-5 that the technology of the present invention was capable of producing gasoline products from DOA that were of good quality and meet the national V standards with low olefin content.

Example IV-1

Both DAO and DOA used in the Example were from Example IV-A, and the properties of DAO and DOA were given in Table IV-1.

The properties of the liquid phase product obtained from DAO subjected to the third hydrogenation unit were shown in Table IV-1.

The DCC unit was operated under conditions of: a reaction temperature of 410° C., a catalyst-to-oil ratio of 3.0, and a retention time of 3 s; and the DCC unit resulted in LCO1 (see Table IV-6 for the properties), HCO1 (see Table IV-6 for the properties), and slurry oil 1.

The DOA and the LCO1 were mixed at a weight ratio of 1:10, and the mixed feedstock (see Table IV-2 for properties thereof) was subjected to hydrotreating by a second hydrogenation unit (fixed bed residual oil hydrotreating unit). The properties of the product were shown in Table IV-3.

The liquid phase product obtained from the first hydrogenation unit was fractionated, and the properties of the first heavy component at a temperature of more than or equal to 350° C. were shown in Table IV-4.

A test was carried out for the first light component at a temperature of less than 350° C. on a fixed bed hydrocracking device. The properties of the obtained hydrocracked product were shown in Table IV-5.

Example IV-2

The DAO and DOA used in the Example were same as in Example IV-1.

The properties of the liquid phase product obtained from DAO subjected to the third hydrogenation unit were same as those in Example IV-1.

The DCC unit was operated under conditions of: a reaction temperature of 420° C., a catalyst-to-oil ratio of 3.0, and a retention time of 3 s; and the DCC unit resulted in LCO2 (see Table IV-6 for the properties), HCO2, and slurry oil 2.

DOA and LCO2 were mixed at a weight ratio of 5:10, and the mixed feedstock (see Table IV-2 for properties thereof) was subjected to hydrotreatment by a first hydrogenation unit (fixed bed residual oil hydrotreating unit). The properties of the product were shown in Table IV-3.

The liquid phase product obtained from the first hydrogenation unit was fractionated, and the properties of the first heavy component at a temperature of more than or equal to 350° C. were shown in Table IV-4.

A test was carried out for the first light component at a temperature of less than 350° C. on a fixed bed hydrocracking device. The properties of the obtained hydrocracked product were shown in Table IV-5.

TABLE IV-2

Properties of the mixed feedstock

| Mixed feedstock | Example IV-1 | Example IV-2 |
|---|---|---|
| Species | DOA LCO 1 | DOA was L CO 2 |
| Ratio by weight | 1:10 | 5:10 |
| State at 20° C. | Liquid | Liquid |
| $C_7$ insoluble substances/wt % | 3.1 | 10.4 |
| Carbon residue, wt % | 4.54 | 9.5 |
| Sulfur, wt % | 1.33 | 2.56 |
| Viscosity (100° C.) (mm²/s) | 1.7 | 3.45 |
| Ni + V (μg/g) | 34.3 | 109.8 |

TABLE IV-3

Properties of product after the fixed bed/moving bed residue hydrotreatment in the first hydrogenation unit

| Item | $C_7$ insoluble substances, wt % | Carbon residue, wt % | Sulfur, wt % | Viscosity (100° C.), mm²/s | (Ni + V), μg/g |
|---|---|---|---|---|---|
| Example IV-1 | 0.5 | 3.2 | 0.20 | 3.1 | 5.1 |
| Example IV-2 | 0.5 | 5.1 | 0.27 | 3.8 | 7.1 |

TABLE IV-4

Properties of the first heavy component

| Item | $C_7$ insoluble substances, wt % | Carbon residue, wt % | Sulfur, wt % | Viscosity (100° C.), mm²/s | (Ni + V), μg/g |
|---|---|---|---|---|---|
| Ex. IV-1 | 3.5 | 7.2 | 0.42 | 80.1 | 15.1 |
| Ex. IV-2 | 5.5 | 8.1 | 0.63 | 93.2 | 17.1 |

TABLE IV-5

Properties of hydrocracking product

| Item | Density (20° C.), g/cm³ | Sulfur μg/g | RON |
|---|---|---|---|
| Example IV-1 | 0.72 | <10 | >92 |
| Example IV-2 | 0.72 | <10 | >92 |

Example V-1

A fifth reaction unit: the feedstock of aromatics-rich fraction oil was LCO1 (properties were shown in Table V-1), from the catalytic cracking device of SINOPEC YANGZI PETROCHEMICAL CO., LTD The fifth reaction unit was operated under conditions of: a reaction temperature of 290°

TABLE IV-1

Properties of DOA, DAO, and liquid-phase product after treatment by the third hydrogenation unit

| Item | DOA | DAO | Liquid phase product[1] | Coal tar | DAO11 | DOA11 |
|---|---|---|---|---|---|---|
| Density (20° C.), g/cm³ | 1132.69 | 989.6 | 943.2 | 985.1 | 965.3 | 1123.22 |
| Carbon residue, wt % | 54.56 | 13.6 | 5.2 | 20.3 | 12.4 | 52.31 |
| Sulfur content, wt % | 6.13 | 3.815 | 0.24 | 4.7 | 3.621 | 6.02 |
| Nitrogen content, wt % | 0.772 | 0.235 | 0.15 | 0.431 | 0.225 | 0.765 |
| (Ni + V), μg/g | 378 | 32.78 | 5.41 | 67.2 | 30.81 | 331 |

[1]Liquid phase product denoted: the liquid phase product after hydrotreatment by the third hydrogenation unit.

C., a reaction pressure of 4 MPa, a liquid hourly volume space velocity of 1 h$^{-1}$, and a volume ratio of hydrogen to oil of 800:1.

First fractionation: the second light component and the second heavy component 1 (properties were shown in the table V-1) had a cutting point of 180° C.;

First reaction unit: the feedstock DOA (from vacuum residue of Iran heavy oil) and the second heavy component 1 were mixed at a weight ratio of 1:10, and the properties were shown in Table V-2. A medium-scaled fixed bed residual oil hydrotreatment device, with a total reactor volume of 200 mL, was used. According to the flowing direction of reactants, an RG-30B protective catalyst, a mineral-rich precursor material 1, a mineral-rich precursor material 2, an RDM-33B residual oil demetallization and desulfurization transition catalyst, and an RCS-31 desulfurization catalyst were sequentially loaded in the first reaction unit, with loading ratios in volume as follows: RG-30B: mineral-rich precursor material V-1: mineral-rich precursor material V-2: RDM-33B:RCS-31=6:30:30:14: 20 (V/V). The operation conditions were as follows: a reaction temperature of 360° C., a reaction pressure of 8 MPa, a liquid hourly volume space velocity of 0.3 h$^{-1}$, and a volume ratio of hydrogen to oil of 800:1. After hydrogenation, properties of the mixed feedstock were shown in Table V-3.

Second fractionation: the liquid phase product obtained by the treatment of the first reaction unit was fractionated to provide a first light component at a temperature of less than 350° C. and a first heavy component at a temperature of more than or equal to 350° C., wherein the properties of the first heavy component were shown in Table V-4.

The first light component was tested in the second reaction unit.

Second reaction unit: a fixed bed hydrocracking device sequentially loaded with s: RS-2100:RHC-131=40:60 (V/V), operated under conditions of: a reaction temperature for the refining section of 370° C., a reaction temperature for the cracking section of 385° C., a reaction pressure of 10 MPa, a liquid hourly volume space velocity of 2.0 h$^{-1}$, and a hydrogen/oil ratio by volume of: 1200:1. The properties of the obtained hydrocracked product were shown in Table V-5.

Example V-2

A fifth reaction unit: the feedstock of aromatics-rich fracttownsea oil was HCO2 (properties were shown in Table V-1), from the catalytic cracking device of SINOPEC ZHENHAI REFINNING & CHEMICAL COMPANY. The fifth reaction unit was operated under conditions of: a reaction temperature of 330° C., a reaction pressure of 6 MPa, a liquid hourly volume space velocity of 1 h$^{-1}$, and a volume ratio of hydrogen to oil of 800:1.

First fractionation: the second light component and the second heavy component 2 (properties were shown in the table V-1) had a cutting point of 190° C.;

A first reaction unit: the feedstock DOA (from vacuum residue of Iran heavy oil) and the second heavy component 2 were mixed at a weight ratio of 5:10, and the properties were shown in Table V-2 The treatment device and the loading of catalysts were same as in example V-1. The operation conditions were as follows: a reaction temperature of 380° C., a reaction pressure of 10 MPa, a liquid hourly volume space velocity of 0.3 h$^{-1}$, and a volume ratio of hydrogen to oil of 800:1. After hydrogenation, properties of the mixed feedstock were shown in Table V-3.

Second fractionation: the liquid phase product obtained by the treatment of the first reaction unit was fractionated to provide a first light component at a temperature of less than 350° C. and a first heavy component at a temperature of more than or equal to 350° C., wherein the properties of the first heavy component were shown in Table V-4.

The first light component was tested in the second reaction unit.

Second reaction unit: same as in example V-1, a hydrocracked product was obtained, and the properties were shown in Table V-5.

Example V-3

A fifth reaction unit: the feedstock of aromatics-rich fraction oil was LCO1 (properties were shown in Table V-1), from the catalytic cracking device of SINOPEC YANGZI PETROCHEMICAL CO., LTD. The fifth reaction unit was operated under conditions of: a reaction temperature of 320° C., a reaction pressure of 6 MPa, a liquid hourly volume space velocity of 1 h$^{-1}$, and a volume ratio of hydrogen to oil of 800:1.

First fractionation: the second light component and the second heavy component 3 (properties were shown in the table V-1) had a cutting point of 190° C.;

A first reaction unit: the feedstock DOA (from vacuum residue of Iran heavy oil) and the second heavy component 3 were mixed at a weight ratio of 10:10, and the properties were shown in Table V-2. The treatment device and the loading of catalysts were same as in example V-1. The operation conditions were as follows: a reaction temperature of 370° C., a reaction pressure of 6 MPa, a liquid hourly volume space velocity of 0.3 h$^{-1}$, and a volume ratio of hydrogen to oil of 800:1. After hydrogenation, properties of the mixed feedstock were shown in Table V-3.

Second fractionation: the liquid phase product obtained by the treatment of the first reaction unit was fractionated to provide a first light component at a temperature of less than 350° C. and a first heavy component at a temperature of more than or equal to 350° C., wherein the properties of the first heavy component were shown in Table V-4.

The first heavy component was subjected to coking reaction at a reaction temperature of 500° C. for a retention time of 0.5 h, to provide a petroleum coke (yield of 30 wt %), wherein the sulfur content was 2.7 wt %.

The first light component was tested in the second reaction unit.

Second reaction unit: same as in example V-1, a hydrocracked product was obtained, and the properties were shown in Table V-5.

TABLE V-1

Properties of aromatics-rich fraction oil before and after hydrogenation

| Item | | Paraffinic alkane wt % | Cycloalkanes wt % | Monocyclic aromatics wt % | Alkyl benzene wt % | Indanes or tetralins wt % | Indenes wt % | Bicyclic and higher aromatics wt % |
|---|---|---|---|---|---|---|---|---|
| Example V-1 | LCO1 | 10.5 | 3.5 | 22.8 | 12 | 8 | 2.8 | 63.2 |
|  | Second heavy component 1 | 2 | 10.5 | 72.8 | 18.5 | 46.4 | 7.9 | 14.7 |
| Example V-2 | HCO 2 | 11.6 | 20.0 | 9.8 | 5 | 4 | 0.8 | 61.6 |
|  | Second heavy component 2 | 2.3 | 22.5 | 67.9 | 15 | 41.5 | 11.4 | 7.3 |
| Example V-3 | LCO1 | 10.5 | 3.5 | 22.8 | 12 | 8 | 2.8 | 63.2 |
|  | Second heavy component 3 | 5.0 | 8.2 | 72.1 | 19 | 47.6 | 5.5 | 14.7 |

TABLE V-2

Properties of mixed feedstock

|  | Example V-1 | Example V-2 | Example V-3 | Example V-4 |
|---|---|---|---|---|
| State at 20° C. | Liquid | Liquid | Liquid | Liquid |
| $C_7$ insoluble substances, wt % | 2.09 | 7.67 | 13.50 | 16.80 |
| Carbon residue, wt % | 2.27 | 8.33 | 19.50 | 25.00 |
| Sulfur, wt % | 1.4 | 2.14 | 3.21 | 3.85 |
| Viscosity (100° C.) (mm$^2$/s) | 1.9 | 8.6 | 35.1 | 36.0 |
| Ni + V (μg/g) | 23 | 104 | 153 | 195 |

|  | Example V-8 | Comparative example 1 | Comparative example 2 |
|---|---|---|---|
| State at 20° C. | Liquid | Liquid | Liquid |
| $C_7$ insoluble substances, wt % | 2.18 | 1.99 | 3.83 |
| Carbon residue, wt % | 3.7 | 2.58 | 4.17 |
| Sulfur, wt % | 1.68 | 1.55 | 2.47 |
| Viscosity (100° C.) (mm$^2$/s) | 3.9 | 3.1 | 5.6 |
| Ni + V (μg/g) | 32 | 25 | 41 |

TABLE V-3

Properties of the product after hydrogenation of the mixed feedstock

| Item | $C_7$ insoluble substances/ wt % | Carbon residue, wt % | Sulfur, wt % | Viscosity (100° C.)/ mm$^2$/s | Ni + V/ (μg/g) |
|---|---|---|---|---|---|
| Example V-1 | 0.6 | 1.0 | 0.12 | 1.7 | 10.1 |
| Example V-2 | 0.6 | 3.1 | 0.27 | 3.2 | 17.1 |
| Example V-3 | 0.5 | 9.6 | 0.45 | 6.1 | 24.6 |

TABLE V-4

Properties of the first heavy component

| Item | Density (20° C.) g/cm$^3$ | $C_7$ insoluble substances wt % | Carbon residue wt % | Sulfur wt % | Viscosity (100° C.) mm$^2$/s | (Ni + V) μg/g |
|---|---|---|---|---|---|---|
| Ex. V-1 | 0.9123 | 1.1 | 2.5 | 0.28 | 78.1 | 15.2 |
| Ex. V-2 | 0.9330 | 2.9 | 6.7 | 0.41 | 81.2 | 25.7 |
| Ex. V-3 | 0.9698 | 3.8 | 14.4 | 1.18 | 100.2 | 36.9 |

TABLE V-5

Properties of the hydrocracking product

| Item | Density (20° C.), g/cm$^3$ | RON | Sulfur content, μg/g |
|---|---|---|---|
| Example V-1 | 0.72 | >92 | <10 |
| Example V-2 | 0.72 | >92 | <10 |
| Example V-3 | 0.72 | >92 | <10 |

Example VI-B

A solvent deasphalting was carried out by using a vacuum residue as feedstock, the solvent was a hydrocarbon mixture comprising butane (a butane content of 75 wt %), wherein the solvent deasphalting was carried out at 120° C., with the solvent:vacuum residue=2:1 (weight ratio), resulting in DAO at a yield of 68 wt %, and DOA at a yield of 32 wt %.

Properties of DAO and DOA obtained were shown in Table VI-1.

Example VI-1

DAO and DOA used in the example were from Example VI-B.

The properties of the liquid phase product obtained from DAO subjected to hydrogenation reaction in the sixth hydrogenation unit were shown in Table VI-1. The liquid product was fend into a DCC unit for reaction, to provide LCO1 (a final distillation point of 350° C., and a content of aromatics of 54%) and HCO1.

LCO1 was subjected to hydrosaturation in a fifth hydrogenation unit and then fractionated, to provide a second light component 1 and a second heavy component 1 with a cutting point of 180° C. The fifth hydrogenation unit was operated under conditions of: a reaction temperature of 290° C., a reaction pressure of 4 MPa, a liquid hourly volume space velocity of 1 $h^{-1}$, and a volume ratio of hydrogen to oil of 800:1. Properties of LCO1 and the second heavy component 1 were shown in Table VI-2.

DOA and the second heavy component 1 were mixed at a weight ratio of 1:10, and the properties of the mixed feedstock were shown in Table VI-3.

The first reaction unit was operated, for the mixed feedstock of DOA and the second heavy component 1, under conditions of: a reaction temperature of 360° C., a reaction pressure of 8 MPa, a liquid hourly volume space velocity of 0.3 $h^{-1}$, and a volume ratio of hydrogen to oil of 800:1. After hydrogenation, properties of the mixed feedstock were shown in Table VI-4.

The liquid phase product obtained from the first hydrogenation unit was fractionated, and the properties of the first heavy component at a temperature of more than or equal to 350° C. were shown in Table VI-5.

The first light component at a temperature of less than 350° C. was tested in the second reaction unit, to provide a hydrocracking product, and the properties thereof were shown in Table VI-6.

Example VI-2

DAO and DOA used in the example were from Example VI-B.

The properties of the liquid phase product obtained from DAO subjected to hydrogenation reaction in the sixth hydrogenation unit were shown in Table VI-1. The liquid-phase product was fed into a DCC unit for reaction, to provide LCO 2 and HCO 2

HCO2 was subjected to hydrosaturation in a fifth hydrogen unit and then fractionated, to provide a second light component 2 and a second heavy component 2 with a cutting point of 180° C. The fifth hydrogenation unit was operated under conditions of: a reaction temperature of 330° C., a reaction pressure of 6 MPa, a liquid hourly volume space velocity of 1 $h^{-1}$, and a volume ratio of hydrogen to oil of 800:1. Properties of HCO2 and the second heavy component 2 were shown in Table VI-2.

DOA and the second heavy component 2 were mixed at a weight ratio of 5:10, and the properties of the mixed feedstock were shown in Table VI-3.

The first reaction unit was operated, for the mixed feedstock of DOA and the second heavy component 2, under conditions of: a reaction temperature of 380° C., a reaction pressure of 10 MPa, a liquid hourly volume space velocity of 0.3 $h^{-1}$, and a volume ratio of hydrogen to oil of 800:1. After hydrogenation, properties of the mixed feedstock were shown in Table VI-4.

The liquid phase product obtained from the first hydrogenation unit was fractionated, and the properties of the first heavy component at a temperature of more than or equal to 350° C. were shown in Table VI-5.

The first light component at a temperature of less than 350° C. was tested in the second reaction unit, to provide a hydrocracking product, and the properties thereof were shown in Table VI-6.

Example VI-3

DAO and DOA used in the example were from Example VI-B.

The properties of the liquid phase product obtained from DAO subjected to hydrogenation reaction in the sixth hydrogenation unit were shown in Table VI-1. The liquid-phase product was fed into a DCC unit for reaction, to provide LCO1 and HCO1.

LCO1 was subjected to hydrosaturation in a fifth hydrogen unit and then fractionated, to provide a second light component 3 and a second heavy component 3 with a cutting point of 180° C. The fifth hydrogenation unit was operated under conditions of: a reaction temperature of 320° C., a reaction pressure of 6 MPa, a liquid hourly volume space velocity of 1 $h^{-1}$, and a volume ratio of hydrogen to oil of 800:1. Properties of LCO1 and the second heavy component 3 were shown in Table VI-2.

DOA and the second heavy component 3 were mixed at a weight ratio of 10:10, and the properties of the mixed feedstock were shown in Table VI-3.

The first reaction unit was operated, for the mixed feedstock of DOA and the second heavy component 3, under conditions of: a reaction temperature of 370° C., a reaction pressure of 6 MPa, a liquid hourly volume space velocity of 0.3 $h^{-1}$, and a volume ratio of hydrogen to oil of 800:1. After hydrogenation, properties of the mixed feedstock were shown in Table VI-4.

The liquid phase product obtained from the first hydrogenation unit was fractionated, and the properties of the first heavy component at a temperature of more than or equal to 350° C. were shown in Table VI-5.

The first heavy component was subjected to coking reaction at a reaction temperature of 500° C. for a retention time of 0.5 h, to provide a petroleum coke (yield of 31 wt %), wherein the sulfur content was 2.6 wt %.

The first light component at a temperature of less than 350° C. was tested in the second reaction unit, to provide a hydrocracking product, and the properties thereof were shown in Table VI-6.

Example VI-4

DAO and DOA used in the example were from Example VI-B.

The properties of the liquid phase product obtained from DAO subjected to hydrogenation reaction in the sixth hydrogenation unit were shown in Table VI-1. The liquid-phase product was fed into a DCC unit for reaction, to provide LCO1 and HCO1.

The aromatics-rich fraction oil used in the example was coal tar (properties shown in Table VI-1) from a coal tar unit in China and LCO1. LCO1 and the coal tar were used at a weight ratio of 1:1. The aromatics-rich fraction oil was subjected to hydrosaturation in a fifth hydrogen unit and then fractionated, to provide a second light component 4 and a second heavy component 4 with a cutting point of 180° C. The fifth hydrogenation unit was operated under conditions of: a reaction temperature of 300° C., a reaction pressure of 10 MPa, a liquid hourly volume space velocity of 0.8 $h^{-1}$, and a volume ratio of hydrogen to oil of 800:1. Properties of the aromatics-rich fraction oil and the second heavy component 4 were shown in Table VI-2.

DOA and the second heavy component 4 were mixed at a weight ratio of 15:10, and the properties of the mixed feedstock were shown in Table VI-3.

The first reaction unit was operated, for the mixed feedstock of DOA and the second heavy component 4, under conditions of: a reaction temperature of 350° C., a reaction pressure of 12 MPa, a liquid hourly volume space velocity of 0.3 $h^{-1}$, and a volume ratio of hydrogen to oil of 800:1. After hydrogenation, properties of the mixed feedstock were shown in Table VI-4.

The liquid phase product obtained from the first hydrogenation unit was fractionated, and the properties of the first heavy component at a temperature of more than or equal to 350° C. were shown in Table VI-5.

The first light component at a temperature of less than 350° C. was tested in the second reaction unit, to provide a hydrocracking product, and the properties thereof were shown in Table VI-6.

Example VI-5

A process similar to Example I-3 was used, except that: In this Example, the temperature for the hydrotreatment of the first reaction unit was 395° C.

The other conditions were the same as in Example VI-3.

After hydrogenation, properties of the mixed feedstock were shown in Table VI-4.

The liquid phase product obtained from the first hydrogenation unit was fractionated, and the properties of the first heavy component at a temperature of more than or equal to 350° C. were shown in Table VI-5.

Example VI-6

Loading of the catalyst and conditions of the hydrotreatment were same as in Example VI-3.

A mixed feedstock same as that in example VI-3 was hydrotreated in the first reaction unit, then, every 30 days, the reaction temperature of the fixed bed was increased by 3° C., and the operation was stopped after 360 days of operation of the hydrogenation test.

The mineral-rich precursor material 1 and the mineral-rich precursor material 2 initially loaded into the reactor became, after reaction, a V-rich material 1 and a V-rich material 2, having a V content of respectively 56 wt % and 47 wt % after roasting analysis, 10 times or more higher than the V content in natural ore, which were thus high-quality materials for preparing V2O5 with high Value.

Example VI-7

A catalytic cracking test was carried out on the first light component at a temperature of less than 350° C. from Example VI-3 in a small scaled catalytic cracking fixed fluidized bed test device, wherein the catalyst was a catalytic cracking catalyst MLC-500 from SINOPEC CATALYST CO., LTD. CHANGLING DIVISION; and is operated under conditions of: a reaction temperature of 540° C., a catalyst-to-oil ratio of 5, and a retention time of 2 s.

As a result, a product gasoline was obtained at a yield of 43 wt %, and the gasoline had a RON octane number of 92.

Example VI-8

The procedures were similar to those of Example VI-1, except that in the present Example, the first heavy component obtained was fed into a delayed coking unit for reaction, to provide a coker gasoline, a coker diesel and a coker wax oil.

The coker diesel had a sulfur content of 0.16 wt %, a condensation point of −13° C., and a cetane number of 49.

The delayed coking unit was operated under conditions of: a reaction temperature of 500° C. and a residence time of 0.5 h.

The coker wax oil had a sulfur content of 0.76 wt %, and a condensation point of 32° C.

The coker gasoline was obtained at a yield of 15%, a sulfur content of 0.08 wt %, and a MON of 60.

The coker diesel and coker wax oil were recycled to the fifth hydrogenation unit and mixed with the LCO1 for hydrosaturation, and then to fractionated, to provide a second light component 8 and a second heavy component 8 with a cutting point of 180° C., for which the reaction conditions were same as those of example VI-1. The properties of the mixed oil of coker diesel, coker wax oil, and LCO1 and the properties of the second heavy component 8 were shown in Table VI-2.

DOA from Example VI-B and the second heavy component 8 were mixed at a weight ratio of 1:10, and the properties of the mixed feedstock were shown in Table VI-3.

The first reaction unit was operated, for the mixed feedstock of DOA and the second heavy component 8, under conditions of: a reaction temperature of 360° C., a reaction pressure of 8 MPa, the liquid hourly volume space velocity was 0.3 $h^{-1}$, and a volume ratio of hydrogen to oil of 800:1. After hydrogenation, properties of the mixed feedstock were shown in Table VI-4.

The liquid phase product obtained from the first hydrogenation unit was fractionated, and the properties of the first heavy component at a temperature of more than or equal to 350° C. were shown in Table VI-5.

The first light component at a temperature of less than 350° C. was tested in the second reaction unit, to provide a hydrocracking product, and the properties thereof were shown in Table VI-6.

Example VI-9

A test was carried out for the first light component at a temperature of less than 350° C. obtained from Example VI-1 on a diesel hydro-upgrading device. A diesel component was obtained.

The hydro-upgrading device was operated under conditions of: a reaction temperature of 350° C., a reaction pressure of 7 MPa, a volume ratio of hydrogen to oil of 800, and a liquid hourly volume space velocity of 1.0 $h^{-1}$.

As a result, the obtained diesel component had a sulfur content of 9 ppm, a condensation point of −32° C., and a cetane number was of 51.9.

Example VI-10

The procedures were similar to those of Example VI-1, except that in the present Example, the loading of the catalysts in the first reaction unit was as follows:

According to the flowing direction of reactants, a hydrogenation protective catalyst, a mineral-rich precursor material 1, a hydrodemetallization and desulfurization catalyst, and a hydrodesulfurization catalyst were sequentially loaded. In the first reaction unit, the loading ratio among the catalysts was as follows: RG-30B: mineral-rich precursor material 1: RDM-33B:RCS-31=6:60: 14:20 (V/V).

After hydrogenation, properties of the mixed feedstock were shown in Table VI-4.

The liquid phase product obtained from the first hydrogenation unit was fractionated, and the properties of the first heavy component at a temperature of more than or equal to 350° C. were shown in Table VI-5.

The first light component at a temperature of less than 350° C. was tested in the second reaction unit, to provide a hydrocracking product, and the properties thereof were shown in Table VI-6.

Example VI-11

The procedures were similar to those of Example VI-1, except that in the present Example, the loading of the catalysts in the first reaction unit was as follows: According to the flowing direction of reactants, a hydrogenation protective catalyst, a mineral-rich precursor material 2, a mineral-rich precursor material 1, a hydrodemetallization and desulfurization catalyst, and a hydrodesulfurization catalyst were sequentially loaded. In the first reaction unit, the loading ratio among the catalysts was as follows: RG-30B: mineral-rich precursor material 2: mineral-rich precursor material 1: RDM-33B:RCS-31=6:30:30: 14:20 (V/V).

After hydrogenation, properties of the mixed feedstock were shown in Table VI-4.

The liquid phase product obtained from the first hydrogenation unit was fractionated, and the properties of the first heavy component at a temperature of more than or equal to 350° C. were shown in Table VI-5.

The first light component at a temperature of less than 350° C. was tested in the second reaction unit, to provide a hydrocracking product, and the properties thereof were shown in Table VI-6.

Example VI-12

The procedures were similar to those of Example VI-1, except that in the present Example, the loading of the catalysts in the first reaction unit was as follows:

According to the flowing direction of reactants, a hydrogenation protective catalyst, a hydrodemetallization and desulfurization catalyst, and a hydrodesulfurization catalyst were sequentially loaded. In the first reaction unit, the loading ratio among the catalysts was as follows: RG-30B: RDM-33B:RCS-31=12:38:50 (V/V).

After hydrogenation, properties of the mixed feedstock were shown in Table VI-4. The liquid phase product obtained from the first hydrogenation unit was fractionated, and the properties of the first heavy component at a temperature of more than or equal to 350° C. were shown in Table VI-5.

The first light component at a temperature of less than 350° C. was tested in the second reaction unit, to provide a hydrocracking product, and the properties thereof were shown in Table VI-6.

Example VI-13

The procedures were similar to those of Example VI-1, except that in the present example, the loading of the catalysts in the first reaction unit was as follows:

According to the flowing direction of reactants, a hydrogenation protective catalyst, a mineral-rich precursor material 3, a hydrodemetallization and desulfurization catalyst, and a hydrodesulfurization catalyst were sequentially loaded. In the first reaction unit, the loading ratio among the catalysts was as follows: RG-30B: mineral-rich precursor material 3: RDM-33B:RCS-31=5:40:20:35 (V/V).

After hydrogenation, properties of the mixed feedstock were shown in Table VI-4.

The liquid phase product obtained from the first hydrogenation unit was fractionated, and the properties of the first heavy component at a temperature of more than or equal to 350° C. were shown in Table VI-5.

The first light component at a temperature of less than 350° C. was tested in the second reaction unit, to provide a hydrocracking product, and the properties thereof were shown in Table VI-6.

Comparative Example VI-1

The catalyst and device were similar to Example VI-1, except that: In the comparative example, the aromatics-rich fraction oil QY (aromatic content 20 wt %) was directly mixed with DOA without passing through a partial hydrosaturation unit. DOA and QY were mixed at a weight ratio of 1:10, and the properties of the mixed feedstock were shown in Table VI-3.

After hydrotreating on the mixed feed feedstock by the first reaction unit, properties of the product were shown in Table VI-4.

The liquid phase product obtained from hydrotreating by the first hydrogenation unit was fractionated, and the properties of the first heavy component at a temperature of more than or equal to 350° C. were shown in Table VI-5.

The first light component at a temperature of less than 350° C. was tested in the second reaction unit, to provide a hydrocracking product, and the properties thereof were shown in Table VI-6.

Comparative Example VI-2

The catalyst and device were similar to Example VI-1, except that:

In the comparative example, the aromatics-rich fraction oil QY was directly mixed with DOA without passing through a partial hydrosaturation unit. DOA and QY were mixed at a weight ratio of 2:10, and the properties of the mixed feedstock were shown in Table VI-3.

After hydrotreating on the mixed feed feedstock by the first reaction unit, properties of the product were shown in Table VI-4.

The liquid phase product obtained from hydrotreating by the first hydrogenation unit was fractionated, and the properties of the first heavy component at a temperature of more than or equal to 350° C. were shown in Table VI-5.

The first light component at a temperature of less than 350° C. was tested in the second reaction unit, to provide a hydrocracking product, and the properties thereof were shown in Table VI-6.

Comparative Example VI-3

The catalyst and device were similar to Example VI-1, except that:

In the comparative example, the aromatics-rich fraction oil QY was directly mixed with DOA without passing through a partial hydrosaturation unit. DOA and QY were mixed at a weight ratio of 3:10. As the mixed feedstock comprised a large amount of solids (at 100° C.), the next experiment could not be carried out.

TABLE VI-1

Properties of DOA, DAO and liquid-phase products after hydrotreating by the sixth hydrogenation unit

| Item | DOA | DAO | Liquid phase product after hydrotreating by the sixth hydrogenation unit |
|---|---|---|---|
| Density (20° C.), g/cm$^3$ | 1135.1 | 990.3 | 946.2 |
| Carbon residue, wt % | 48.9 | 11.6 | 4.7 |
| Sulfur content, wt % | 6.42 | 3.6 | 0.32 |
| Nitrogen content, wt % | 1.4 | 0.68 | 0.35 |
| (Ni + V), μg/g | 481 | 45.6 | 6.1 |

TABLE VI-2

Properties of aromatics-rich fraction oil before and after hydrogenation

| | Item | Paraffinic alkane wt % | Cycloalkanes wt % | Monocyclic aromatics wt % | Alkyl benzene wt % | Indanes or tetralins wt % | Indenes wt % | Bicyclic and higher aromatics wt % |
|---|---|---|---|---|---|---|---|---|
| Example VI-1 | LCO 1 | 12.5 | 3.5 | 25.9 | 12 | 6 | 7.9 | 58.1 |
| | Second heavy component 1 | 3 | 9.8 | 70.8 | 18.5 | 45.9 | 6.4 | 16.4 |
| Example VI-2 | HCO2 | 11.6 | 20 | 11.9 | 5 | 4 | 2.9 | 56.5 |
| | Second heavy component 2 | 1.3 | 22.5 | 68.3 | 12 | 41.5 | 14.8 | 7.9 |
| Example VI-3 | LCO1 | 12.5 | 3.5 | 25.9 | 12 | 6 | 7.9 | 58.1 |
| | Second heavy component 3 | 9 | 8.2 | 71.9 | 12 | 45.8 | 14.1 | 10.9 |
| Example VI-4 | LCO1 + coal tar | 19.6 | 13.6 | 16.9 | 9.2 | 7.1 | 0.6 | 49.9 |
| | Second heavy component 4 | 9.8 | 14.9 | 73.9 | 15 | 51 | 7.9 | 1.4 |
| Example VI-8 | Coker wax oil + coker diesel + LCO1 | 25.6 | 32.4 | 20.1 | 11 | 6.9 | 2.2 | 21.9 |
| | Second heavy component 8 | 10.1 | 29.1 | 48.9 | 9.1 | 36.9 | 2.9 | 11.9 |

TABLE VI-3

Properties of the mixed feedstock

| | Example VI-1 | Example VI-2 | Example VI-3 | Example VI-4 |
|---|---|---|---|---|
| Species | DOA:second heavy component 1 | DOA:second heavy component 2 | DOA:second heavy component 3 | DOA:second heavy component 4 |
| Ratio, wt | 1:10 | 5:10 | 10:10 | 15:10 |
| State at 20° C. | Liquid | Liquid | Liquid | Liquid |
| C$_7$ insoluble substances, wt % | 3.3 | 10.1 | 15.3 | 18.2 |
| Carbon residue, wt % | 4.5 | 9.2 | 23.3 | 27.3 |
| Sulfur, wt % | 1.01 | 2.01 | 3.33 | 3.91 |
| Viscosity (100° C.) (mm$^2$/s) | 3.2 | 5.3 | 40.1 | 56.4 |
| Ni + V (μg/g) | 39.2 | 148.1 | 252.2 | 292.6 |

TABLE VI-3-continued

Properties of the mixed feedstock

| | Examples VI-8 | Comparative example VI-1 | Comparative example VI-2 |
|---|---|---|---|
| Species | DOA:second heavy component 8 | DOA:QY | DOA:QY |
| Ratio, wt | 1:10 | 1:10 | 2:10 |
| State at 20° C. | Liquid | Liquid | Liquid |
| $C_7$ insoluble substances, wt % | 3.4 | 2.9 | 5.4 |
| Carbon residue, wt % | 4.81 | 4.73 | 5.41 |
| Sulfur, wt % | 1.51 | 1.02 | 1.73 |
| Viscosity (100° C.) (mm$^2$/s) | 3.1 | 3.8 | 4.4 |
| Ni + V (μg/g) | 39.9 | 36.2 | 56.2 |

TABLE VI-4

Properties of product after hydrotreating of the mixed feedstock

| Item | $C_7$ insoluble substances, wt % | Carbon residue, wt % | Sulfur, wt % | Viscosity (100° C.), mm$^2$/s | Ni + V (μg/g) |
|---|---|---|---|---|---|
| Ex. VI-1 | 0.5 | 2.1 | 0.20 | 2.1 | 7.2 |
| Ex. VI-2 | 0.6 | 4.3 | 0.27 | 3.2 | 15.1 |
| Ex. VI-3 | 1.6 | 10.7 | 0.35 | 10.5 | 34.6 |
| Ex. VI-4 | 1.9 | 11.6 | 0.59 | 23.1 | 39.8 |
| Ex. VI-5 | 1.5 | 10.1 | 0.33 | 9.8 | 32.1 |
| Ex. VI-8 | 0.6 | 2.5 | 0.25 | 3.1 | 8.5 |
| Ex. VI-10 | 0.6 | 2.6 | 0.22 | 2.8 | 7.9 |
| Ex. VI-11 | 0.7 | 2.8 | 0.25 | 3.0 | 8.1 |
| Ex. VI-12 | 0.9 | 2.9 | 0.27 | 3.0 | 9.0 |
| Ex. VI-13 | 0.7 | 2.9 | 0.26 | 3.1 | 8.2 |
| C. Ex. VI-1 | 2.1 | 3.4 | 0.51 | 3.2 | 15.6 |
| C. Ex. VI-2 | 3.5 | 4.3 | 0.56 | 4.1 | 39.9 |

TABLE VI-5

Properties of first heavy component

| Item | Density (20° C.) g/cm$^3$ | $C_7$ insoluble substances wt % | Carbon residue wt % | Sulfur wt % | Viscosity (100° C.) mm$^2$/s | (Ni + V) μg/g |
|---|---|---|---|---|---|---|
| Ex. VI-1 | 0.9221 | 3.8 | 3.2 | 0.33 | 79.3 | 10.9 |
| Ex. VI-2 | 0.9327 | 5.9 | 6.5 | 0.49 | 83.2 | 22.9 |
| Ex. VI-3 | 0.9730 | 6.4 | 16.1 | 0.63 | 99.9 | 54.1 |
| Ex. VI-4 | 0.9811 | 8.9 | 17.4 | 0.89 | 109.6 | 60.9 |
| Ex. VI-5 | 0.9710 | 6.2 | 15.2 | 0.50 | 93.1 | 48.7 |
| Ex. VI-8 | 0.9229 | 4.1 | 3.8 | 0.38 | 82.3 | 13.1 |
| Ex. VI-10 | 0.9218 | 3.9 | 3.9 | 0.33 | 80.5 | 12 |
| Ex. VI-11 | 0.9219 | 3.9 | 4.1 | 0.35 | 83.4 | 12 |
| Ex. VI-12 | 0.9222 | 4.1 | 4.4 | 0.41 | 86.7 | 14 |
| Ex. VI-13 | 0.9220 | 4.0 | 4.2 | 0.39 | 85.0 | 12 |
| C.Ex. VI-1 | 0.9456 | 4.5 | 5.1 | 0.97 | 95.1 | 33 |
| C.Ex. VI-2 | 0.9517 | 4.6 | 5.0 | 1.14 | 98.7 | 50 |

TABLE VI-6

Properties of hydrocracking product

| Item | Density (20° C.)/g/cm$^3$ | RON | Sulfur content, μg/g |
|---|---|---|---|
| Ex. VI-1 | 0.72 | >92 | <10 |
| Ex. VI-2 | 0.72 | >92 | <10 |
| Ex. VI-3 | 0.72 | >92 | <10 |
| Ex. VI-4 | 0.72 | >92 | <10 |
| Ex. VI-8 | 0.72 | >92 | <10 |
| Ex. VI-10 | 0.72 | >92 | <10 |
| Ex. VI-11 | 0.72 | >92 | <10 |
| Ex. VI-12 | 0.72 | >92 | <10 |
| Ex. VI-13 | 0.72 | >92 | <10 |
| C. Ex. VI-1 | 0.72 | <92 | 12 |
| C. Ex. VI-2 | 0.72 | <92 | 13 |

TABLE VI-7

Properties of mineral-rich precursor material

| | Loss on ignition wt % | Specific area, m$^2$/g | Water adsorption, g/g |
|---|---|---|---|
| Mineral-rich precursor material 1 | 13.5 | 263 | 1.08 |
| Mineral-rich precursor material 2 | 29.9 | 279 | 1.22 |

TABLE VI-7-continued

| Properties of mineral-rich precursor material | | | |
|---|---|---|---|
| | Loss on ignition wt % | Specific area, m²/g | Water adsorption, g/g |
| Mineral-rich precursor material 3 | 20.5 | 99 | 1.05 |

From the results above, it can be seen that the technology of the present invention enables high quality raw materials for the production of low sulfur ship fuel or low sulfur coke products from DOA.

Moreover, the technology of the invention can provide gasoline products with high quality meeting national V standards.

The preferred embodiments of the present invention have been described above in detail, but the present invention is not limited thereto. Within the scope of the technical idea of the invention, many simple modifications can be made to the technical solution of the invention, including various technical features being combined in any other suitable ways, and these simple modifications and combinations should also be regarded as the disclosure of the invention, and all fall within the scope of the invention.

What is claimed is:

1. A process for hydrotreating deoiled asphalt, comprising:
   (1) introducing a heavy oil feedstock into a solvent deasphalting unit for solvent deasphalting treatment, to provide a deoiled asphalt and a deasphalted oil;
   (2) introducing a mixed feedstock obtained by mixing the deoiled asphalt and an aromatics-containing stream into a first reaction unit for hydrogenation reaction, wherein the composition and the ratio of the deoiled asphalt and the aromatics-containing stream are that the mixed feedstock is in a liquid state at a temperature of not higher than 400° C., and the deoiled asphalt and the aromatics-containing stream are used at weight ratio of 1:10 to 50:10;
   (11) introducing the deasphalted oil into a third hydrogenation unit for hydrogenation reaction to obtain a liquid phase effluent, and introducing the liquid phase effluent obtained in the third hydrogenation unit into a DCC unit for reaction, to provide propylene, LCO, HCO and a slurry oil;
   (13) introducing the slurry oil obtained in the DCC unit into a fourth hydrogenation unit for demetallization reaction, to provide demetallized slurry oil; and incorporating the LCO, the HCO, and/or the slurry oil obtained in the DCC unit and/or the demetallized slurry oil obtained in the fourth hydrogenation unit into the aromatics-containing stream in step (2) or using the LCO, the HCO, and/or the slurry oil obtained in the DCC unit and/or the demetallized slurry oil obtained in the fourth hydrogenation unit as the aromatics-containing stream in step (2);
   (21) separating a liquid phase product from the first reaction unit into a first light component and a first heavy component, wherein the first light component and the first heavy component have a cutting point of 240-450° C., and wherein the separation is optionally carried out by fractional distillation;
   (31) introducing the first light component into a second reaction unit for reaction, to provide at least one product selected from the group consisting of a gasoline component, a diesel component and a BTX feedstock component, wherein the second reaction unit is at least one selected from the group consisting of a hydrocracking unit, a catalytic cracking unit and a diesel hydro-upgrading unit; and
   (32) introducing the first heavy component into a delayed coking unit for reaction, to provide at least one product selected from the group consisting of coker gasoline, coker diesel, coker wax oil and low sulfur petroleum coke; or using the first heavy component as a low sulfur ship fuel oil component.

2. The process according to claim 1, wherein in step (2), the deoiled asphalt and the aromatics-containing stream are used in such a ratio that the mixed feedstock formed from the deoiled asphalt and the aromatics-containing stream has a viscosity at 100° C. of not more than 400 mm²/s.

3. The process according to claim 1, wherein in step (2), the aromatics-containing stream is an aromatics-rich fraction oil and/or aromatic compounds.

4. The process according to claim 3, wherein the aromatic compound is at least one selected from the group consisting of benzene, toluene, xylene, naphthalene, naphthalene substituted with at least one $C_{1-6}$ alkyl group, tricyclic or higher aromatic hydrocarbon.

5. The process according to claim 3, wherein the aromatics-rich fraction oil has a distillation end point of 200-540° C., an aromatic hydrocarbon content of more than or equal to 20 wt %; and the aromatics-rich fraction oil is at least one selected from the group consisting of LCO, HCO, FGO, ethylene tar, coal tar, coker diesel and coker wax oil.

6. The process according to claim 1, wherein in step (2), the deoiled asphalt and the aromatics-containing stream are used at weight ratio of 3:10 to 30:10.

7. The process according to claim 1, wherein in step (2), the deoiled asphalt is a deoiled asphalt obtained by subjecting a heavy oil feedstock to a solvent deasphalting treatment in a solvent deasphalting unit;
   in the solvent deasphalting unit, the deoiled asphalt is obtained at a yield of not more than 50%.

8. The process according to claim 1, wherein the process further comprises: recycling the coker diesel and/or coker wax oil obtained in step (32) back to step (2) for as at least part of the aromatics-containing stream.

9. The process according to claim 1, wherein in step (2), the first reaction unit is operated under conditions of: a reaction temperature of 280-450° C., a reaction pressure of 8.0-20.0 MPa, a volume ratio of hydrogen to oil of 400-2000, and a liquid hourly volume space velocity of 0.05-1.2 $h^{-1}$.

10. The process according to claim 1, wherein in step (31), the second reaction unit is a hydrocracking unit,
   wherein the hydrocracking unit is operated under conditions of: a reaction temperature of 330-420° C., a reaction pressure of 5.0-18.0 MPa, a volume ratio of hydrogen to oil of 500-2000, and a liquid hourly volume space velocity of 0.3-3.0 $h^{-1}$; and/or
   the hydrocracking unit is loaded with at least one hydrotreating catalyst and at least one hydrocracking catalyst.

11. The process according to claim 1, wherein in step (31), the second reaction unit is a catalytic cracking unit, and the catalytic cracking unit is a fluidized catalytic cracking unit;
   wherein the fluidized catalytic cracking unit is operated under conditions of: a reaction temperature of 500-600° C., a catalyst-to-oil ratio of 3-12, and a retention time of 1-10 s.

12. The process according to claim 1, wherein in step (31), the second reaction unit is a diesel hydro-upgrading unit, wherein the diesel hydro-upgrading unit is operated under conditions of: a reaction temperature of 330-420° C., a reaction pressure of 5.0-18.0 MPa, a volume ratio of hydrogen to oil of 500-2000, and a liquid hourly volume space velocity of 0.3-3.0 h$^{-1}$; and/or the diesel hydro-upgrading unit is loaded with at least one diesel hydro-upgrading catalyst.

13. The process according to claim 1, wherein in step (32), the first heavy component is fed into a delayed coking unit for reaction to provide at least one product selected from the group consisting of coker gasoline, coker diesel, coker wax oil, and low sulfur petroleum coke, and the delayed coking unit is operated under conditions of: a reaction temperature of 440-520° C., and a retention time of 0.1-4 h.

14. The process according to claim 13, wherein in step (32), the first heavy component has a sulfur content of not greater than 1.8 wt %, and the first heavy component is fed into a delayed coking unit for reaction, to provide a low-sulfur petroleum coke having a sulfur content of not greater than 3 wt %.

15. The process according to claim 1, wherein in step (32), the first heavy component is useful as a low-sulfur ship fuel oil component and the low-sulfur ship fuel oil component has a sulfur content of not greater than 0.5 wt %.

16. The process according to claim 1, wherein the first reaction unit is a fixed bed hydrogenation unit, a moving bed-fixed bed hydrogenation combined unit, or a moving bed hydrogenation unit.

17. The process according to claim 1, wherein,
the first reaction unit comprises a mineral-rich precursor material and/or a hydrogenation catalyst, the hydrogenation catalyst can catalyze at least one reaction selected from hydrodemetallization reaction, hydrodesulfurization reaction, hydrodeasphalting reaction and hydrodecarbonization reaction, and the mineral-rich precursor material is a material capable of adsorbing at least one metal selected from V, Ni, Fe, Ca and Mg.

18. The process according to claim 17, wherein in step (2), the mineral-rich precursor material comprises a support and an active component element loaded on the support, the support is at least one selected from the group consisting of aluminum hydroxide, alumina and silica, and the active component element is at least one metal element selected from Group VIB and Group VIII.

19. The process according to claim 17, wherein in step (2), the mineral-rich precursor material has a loss on ignition of not less than 3 wt %, a specific surface area of not less than 80 m$^2$/g, and a water absorption of not less than 0.9 g/g.

20. The process according to claim 19, wherein in step (2), the first mineral-rich precursor material has a loss on ignition of 3-15 wt %, and the second mineral-rich precursor material has a loss on ignition of not less than 15 wt %.

21. The process according to claim 20, wherein the first mineral-rich precursor material and the second mineral-rich precursor material are loaded at a ratio by volume of from 5:95 to 95:5.

22. The process according to claim 19, wherein in step (2), according to the flowing direction of reactants, the first reaction unit is sequentially loaded with a first mineral-rich precursor material and a second mineral-rich precursor material, and the second mineral-rich precursor material has a loss on ignition equal to or greater than that of the first mineral-rich precursor material.

23. The process according to claim 1, wherein in step (2), the first reaction unit is a moving bed-fixed bed hydrogenation combined unit, and the moving bed is loaded with a mineral-rich precursor material, the fixed bed is sequentially loaded with a mineral-rich precursor material and a hydrogenation catalyst or the fixed bed is loaded with a hydrogenation catalyst.

24. The process according to claim 23, wherein the ratio of the volume of the mineral-rich precursor material loaded in the moving bed to the sum of the volumes of the mineral-rich precursor material and the hydrogenation catalyst loaded in the fixed bed is from 10:90 to 60:40.

25. The process according to claim 23, wherein the process further comprises: replacing the mineral-rich precursor material loaded in the moving bed with a fresh mineral-rich precursor material in each period, wherein the replacement proportion accounts for 5-20 wt %, of the total amount of the mineral-rich precursor material loaded in the moving bed;
the period is 5-20 days.

26. The process according to claim 1, wherein the aromatics-containing stream further comprises
at least one selected from ethylene tar, coal tar, coker diesel and coker wax oil.

27. The process according to claim 1, wherein in step (11), the operation conditions in the DCC unit are controlled such that the aromatic content of the LCO and/or HCO is more than or equal to 60 wt %.

28. The process according to claim 1, wherein in step (11), the third hydrogenation unit is a fixed bed hydrogenation unit, and the third hydrogenation unit is operated under conditions of: a reaction temperature of 280-400° C., a reaction pressure of 6.0-14.0 MPa, a volume ratio of hydrogen to oil of 600-1200, and a liquid hourly space velocity of 0.3-2.0 h$^{-1}$.

29. The process according to claim 1, wherein in step (11), the third hydrogenation unit is loaded with at least two hydrogenation catalysts;
wherein the hydrogenation catalyst is a catalyst capable of catalyzing at least one reaction selected from the group consisting of a hydrodemetallization reaction, a hydrodesulfurization reaction, and a hydrodecarbonization reaction; and/or
wherein the hydrogenation catalyst comprises alumina as a support and a metal element from Group VIB and/or Group VIII as an active component element, and optionally at least one auxiliary element selected from P, Si, F and B.

30. The process according to claim 1, wherein in step (2), the first reaction unit is a fixed bed hydrogenation unit and the first reaction unit is loaded with at least two hydrotreating catalysts;
wherein the hydrotreating catalyst is a catalyst capable of catalyzing at least one reaction selected from the group consisting of an asphaltene conversion reaction, a hydrodemetallization reaction, a hydrodesulfurization reaction, and a hydrodecarbonization reaction; and/or
wherein the hydrotreating catalyst comprises alumina as a support and a metal element from Group VIB and/or Group VIII as an active component element, and optionally also comprises at least one auxiliary element selected from P, Si, F and B.

31. The process according to claim 1, wherein in step (2), the first reaction unit is a moving bed hydrogenation unit and the first reaction unit is loaded with at least one moving bed hydrotreating catalyst;
wherein the moving bed hydrotreating catalyst comprises alumina as a support and a metal element from Group VIB and/or Group VIII as an active component element, and optionally further comprises at least one auxiliary element selected from P, Si, F and B.

32. The process according to claim 1, wherein the process further comprises: recycling the coker diesel and/or coker wax oil obtained in step (32) back to step (2) as at least part of the aromatics-containing stream.

33. The process according to claim 1, wherein in step (13), the fourth hydrogenation unit is a fixed bed hydrogenation unit and the fourth hydrogenation unit is operated under conditions of: a reaction temperature of 200-280° C., a reaction pressure of 3.0-6.0 MPa, a volume ratio of hydrogen to oil of 600-1200, and a liquid hourly space velocity of 0.5-2.5 $h^{-1}$.

34. The process according to claim 1, wherein the process further comprises: circulating the slurry oil obtained in the DCC unit back to the solvent deasphalting unit for solvent deasphalting.

35. The process according to claim 1, further comprising:
Step (16): introducing an aromatics-rich fraction oil into a fifth reaction unit for hydrosaturation, followed by fractionation, to provide a second light component and a second heavy component, wherein the second light component and the second heavy component has a cutting point of 100-250° C., and the aromatic content in the second heavy component is more than or equal to 20 wt %; and
incorporating the second heavy component into the aromatics-containing stream in step (2).

36. The process according to claim 35, wherein in step (16), the fifth reaction unit is at least one of a fixed bed reactor, a moving bed reactor and a boiling bed reactor;
wherein the fifth reaction unit is operated under conditions of: a reaction temperature of 200-420° C., a reaction pressure of 2-18 MPa, a liquid hourly space velocity of 0.3-10 $h^{-1}$, and a volume ratio of hydrogen to oil of 50-5000.

37. The process according to claim 35, further comprising:
(14) introducing the deasphalted oil into a sixth hydrogenation unit for hydrogenation reaction, and introducing the liquid phase effluent obtained in the sixth hydrogenation unit into a DCC unit for reaction, to provide propylene, LCO, HCO and slurry oil, wherein the sixth hydrogenation unit is a fixed bed hydrogenation unit; and
LCO and/or HCO from the DCC unit being incorporated into the aromatics-rich fraction oil in step (16) or being used as the aromatics-rich fraction oil in step (16).

38. The process according to claim 37, wherein the DCC unit is operated under conditions of: a reaction temperature of 500-650° C., a catalyst-to-oil ratio of 3-12, and a retention time of 0.6-6 s.

39. The process according to claim 38, wherein the process further comprises: recycling the coker diesel and/or the coker wax oil obtained in step (32) back to the fifth reaction unit for hydrosaturation.

40. The process according to claim 39, wherein in step (14), the sixth hydrogenation unit is operated under conditions of: a reaction temperature of 280-400° C., a reaction pressure of 6.0-14.0 MPa, a volume ratio of hydrogen to oil of 600-1200, and a liquid hourly volume space velocity of 0.3-2.0 $h^{-1}$;
wherein in step (14), the sixth hydrogenation unit is loaded with at least two hydrogenation catalysts;
the hydrogenation catalyst is a catalyst capable of catalyzing at least one reaction selected from the group consisting of a hydrodemetallization reaction, a hydrodesulfurization reaction, and a hydrodecarbonization reaction; and/or
the hydrogenation catalyst comprises alumina as the support and a metal element from Group VIB and/or Group VIII as the active component element, and the hydrogenation catalyst optionally further comprises at least one auxiliary element selected from P, Si, F and B.

* * * * *